United States Patent
Damnjanovic et al.

(10) Patent No.: US 11,923,941 B2
(45) Date of Patent: Mar. 5, 2024

(54) SIDELINK APERIODIC CHANNEL STATE INFORMATION REPORTING TRIGGERED BY A BASE STATION

(71) Applicant: QUALCOMM Incorporated, San Diego, CA (US)

(72) Inventors: Jelena Damnjanovic, Del Mar, CA (US); Tao Luo, San Diego, CA (US); Juan Montojo, San Diego, CA (US); Junyi Li, Franklin Park, NJ (US); Sony Akkarakaran, Poway, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 17/230,611

(22) Filed: Apr. 14, 2021

(65) Prior Publication Data

US 2021/0328643 A1    Oct. 21, 2021

Related U.S. Application Data

(60) Provisional application No. 63/010,775, filed on Apr. 16, 2020.

(51) Int. Cl.
| | |
|---|---|
| *H04B 7/06* | (2006.01) |
| *H04L 1/00* | (2006.01) |
| *H04L 5/00* | (2006.01) |
| *H04W 24/10* | (2009.01) |
| *H04W 92/18* | (2009.01) |

(52) U.S. Cl.
CPC ......... *H04B 7/0626* (2013.01); *H04L 1/0003* (2013.01); *H04L 5/0051* (2013.01); *H04W 24/10* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2020/0022089 A1* | 1/2020 | Guo | ...................... | H04W 24/08 |
| 2020/0029340 A1* | 1/2020 | He | ........................ | H04W 76/14 |

(Continued)

OTHER PUBLICATIONS

Author Unknown, Remaining Issues: Sidelink CSI Reporting, Interruption handling, pp. 1-3, Apr. 24, 2020.*

*Primary Examiner* — Christopher M Crutchfield
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may receive, from a base station, a message that triggers aperiodic channel state information (CSI) reporting for sidelink communications between the UE and another UE, wherein the message indicates a first set of sidelink CSI reference signal (CSI-RS) resources to be used by the UE for CSI-RS transmission; transmit a first set of CSI-RSs in the first set of sidelink CSI-RS resources; receive an indication of one or more modulation and coding schemes (MCSs) for sidelink communications between the UE and the other UE based at least in part on transmitting the first set of CSI-RSs; and communicate with the other UE using an MCS of the one or more MCSs. Numerous other aspects are provided.

30 Claims, 11 Drawing Sheets

(56) References Cited

U.S. PATENT DOCUMENTS

| | | | |
|---|---|---|---|
| 2021/0274578 A1* | 9/2021 | Yum | H04L 1/0006 |
| 2022/0225143 A1* | 7/2022 | Sun | H04W 72/542 |
| 2022/0329301 A1* | 10/2022 | Shin | H04B 7/0632 |
| 2022/0330130 A1* | 10/2022 | Zhang | H04W 72/20 |
| 2023/0026237 A1* | 1/2023 | Evans | A61K 31/522 |
| 2023/0199719 A1* | 6/2023 | Lee | H04L 1/1896 |
| | | | 370/329 |

* cited by examiner

SIDELINK APERIODIC CHANNEL STATE INFORMATION REPORTING TRIGGERED BY A BASE STATION

CROSS-REFERENCE TO RELATED APPLICATION

This patent application claims priority to U.S. Provisional Patent Application No. 63/010,775, filed on Apr. 16, 2020, entitled "SIDELINK APERIODIC CHANNEL STATE INFORMATION REPORTING TRIGGERED BY A BASE STATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for sidelink aperiodic channel state information reporting triggered by a base station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment, may include receiving, from a base station, a message that triggers aperiodic channel state information (CSI) reporting for sidelink communications between the UE and another UE, wherein the message indicates a first set of sidelink CSI reference signal (CSI-RS) resources to be used by the UE for CSI-RS transmission; transmitting a first set of CSI-RSs in the first set of sidelink CSI-RS resources; receiving an indication of one or more modulation and coding schemes (MCSs) for sidelink communications between the UE and the other UE based at least in part on transmitting the first set of CSI-RSs; and communicating with the other UE using an MCS of the one or more MCSs.

In some aspects, a method of wireless communication, performed by a base station, may include transmitting, to a UE, a message that triggers aperiodic CSI reporting for sidelink communications between the UE and another UE, wherein the message indicates a first set of sidelink CSI-RS resources to be used by the UE for CSI-RS transmission; receiving a sidelink aperiodic CSI report for sidelink communications between the UE and the other UE; and transmitting, to at least one of the UE or the other UE, an indication of one or more modulation and coding schemes (MCSs) for sidelink communications between the UE and the other UE based at least in part on receiving the sidelink aperiodic CSI report.

In some aspects, a user equipment for wireless communication may include a memory and one or more processors coupled to the memory. The memory and the one or more processors may be configured to receive, from a base station, a message that triggers aperiodic CSI reporting for sidelink communications between the UE and another UE, wherein the message indicates a first set of sidelink CSI-RS resources to be used by the UE for CSI-RS transmission; transmit a first set of CSI-RSs in the first set of sidelink CSI-RS resources; receive an indication of one or more MCSs for sidelink communications between the UE and the other UE based at least in part on transmitting the first set of CSI-RSs; and communicate with the other UE using an MCS of the one or more MCSs.

In some aspects, a base station for wireless communication may include a memory and one or more processors coupled to the memory. The memory and the one or more processors may be configured to transmit, to a UE, a message that triggers aperiodic CSI reporting for sidelink communications between the UE and another UE, wherein the message indicates a first set of sidelink CSI-RS resources to be used by the UE for CSI-RS transmission; receive a sidelink aperiodic CSI report for sidelink communications between the UE and the other UE; and transmit, to at least one of the UE or the other UE, an indication of one or more MCSs for sidelink communications between the UE and the other UE based at least in part on receiving the sidelink aperiodic CSI report.

In some aspects, a non-transitory computer-readable medium may store one or more instructions for wireless communication. The one or more instructions, when executed by one or more processors of a UE, may cause the one or more processors to receive, from a base station, a message that triggers aperiodic CSI reporting for sidelink communications between the UE and another UE, wherein the message indicates a first set of sidelink CSI-RS resources to be used by the UE for CSI-RS transmission; transmit a first set of CSI-RSs in the first set of sidelink CSI-RS resources; receive an indication of one or more MCSs for sidelink communications between the UE and the other UE based at least in part on transmitting the first set of CSI-RSs; and communicate with the other UE using an MCS of the one or more MCSs.

In some aspects, a non-transitory computer-readable medium may store one or more instructions for wireless communication. The one or more instructions, when executed by one or more processors of a base station, may cause the one or more processors to transmit, to a UE, a message that triggers aperiodic CSI reporting for sidelink communications between the UE and another UE, wherein the message indicates a first set of sidelink CSI-RS resources to be used by the UE for CSI-RS transmission; receive a sidelink aperiodic CSI report for sidelink communications between the UE and the other UE; and transmit, to at least one of the UE or the other UE, an indication of one or more MCSs for sidelink communications between the UE and the other UE based at least in part on receiving the sidelink aperiodic CSI report.

In some aspects, an apparatus for wireless communication may include means for receiving, from a base station, a message that triggers aperiodic CSI reporting for sidelink communications between a UE and another UE, wherein the message indicates a first set of sidelink CSI-RS resources to be used by the UE for CSI-RS transmission; means for transmitting a first set of CSI-RSs in the first set of sidelink CSI-RS resources; means for receiving an indication of one or more MCSs for sidelink communications between the UE and the other UE based at least in part on transmitting the first set of CSI-RSs; and means for communicating with the other UE using an MCS of the one or more MCSs.

In some aspects, an apparatus for wireless communication may include means for transmitting, to a UE, a message that triggers aperiodic CSI reporting for sidelink communications between the UE and another UE, wherein the message indicates a first set of sidelink CSI-RS resources to be used by the UE for CSI-RS transmission; means for receiving a sidelink aperiodic CSI report for sidelink communications between the UE and the other UE; and means for transmitting, to at least one of the UE or the other UE, an indication of one or more MCSs for sidelink communications between the UE and the other UE based at least in part on receiving the sidelink aperiodic CSI report.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
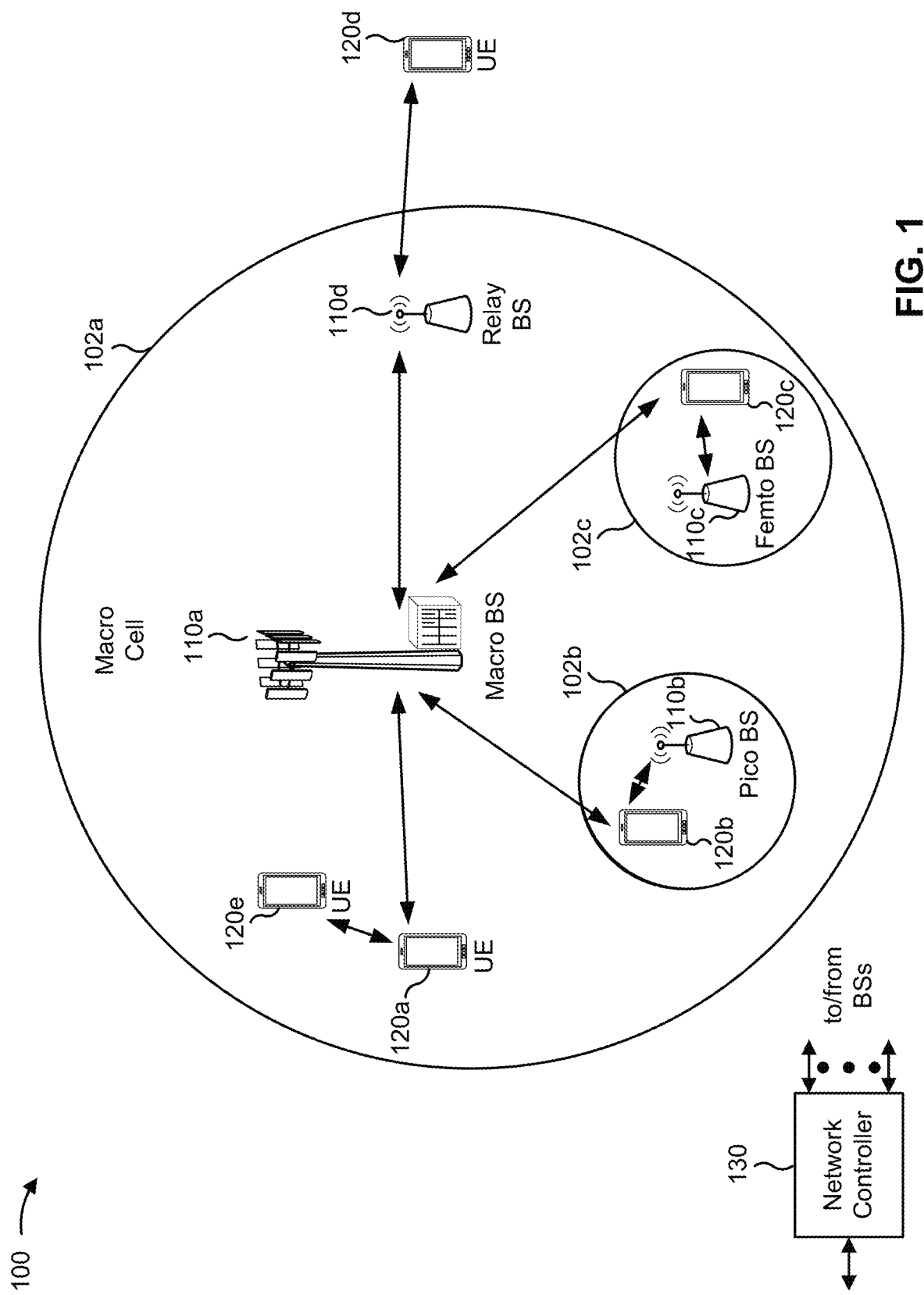
FIG. 1 is a block diagram illustrating an example of a wireless communication network, in accordance with the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station or BS 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
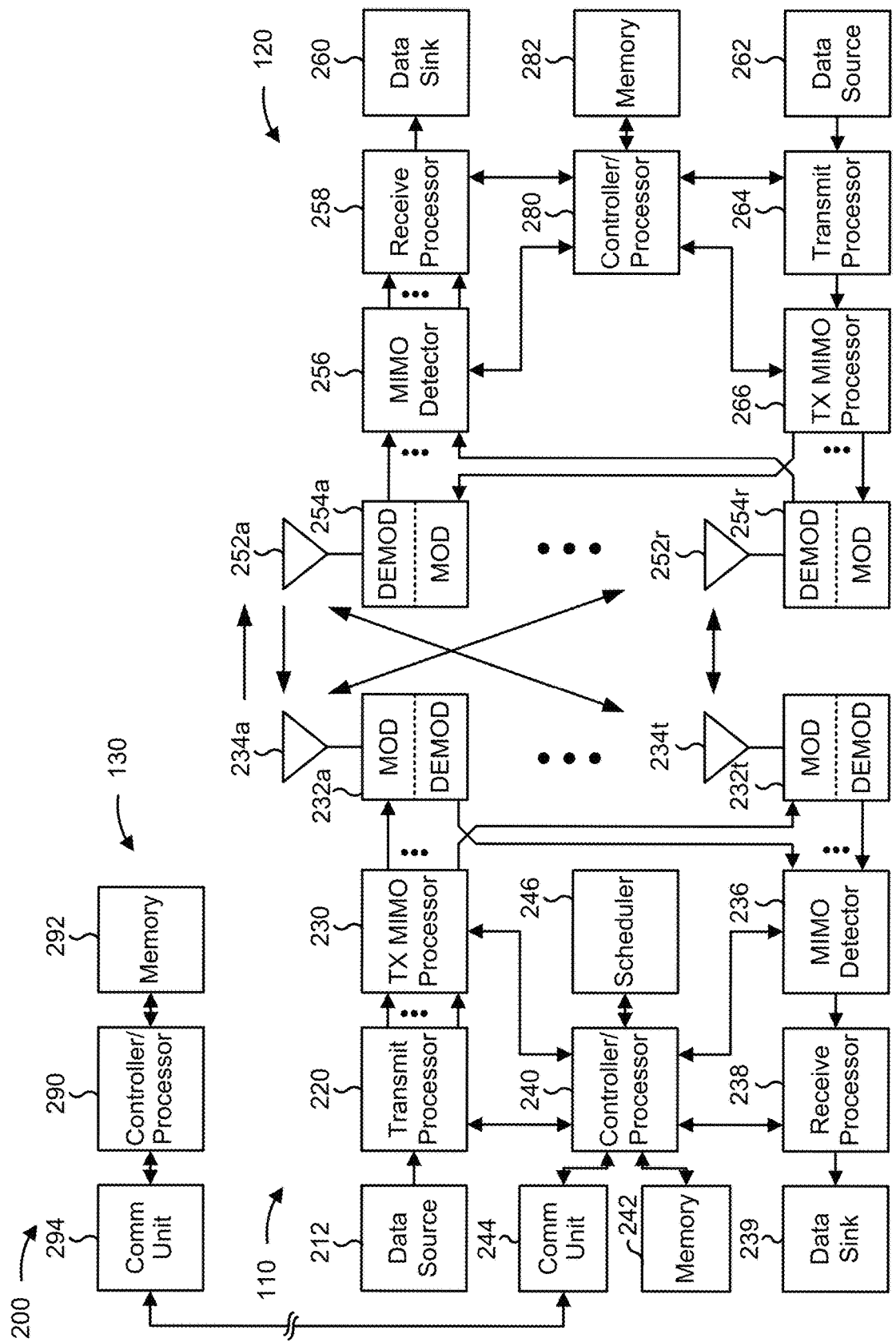
FIG. 2 is a block diagram illustrating an example of a base station in communication with a UE in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with aperiodic channel state information (CSI) reporting and modulation and coding scheme (MCS) control triggered by a base station, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1000 of FIG. 10, process 1100 of FIG. 11, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving, from a base station (e.g., base station 110), a message that triggers aperiodic CSI reporting for sidelink communications between the UE 120 and another UE (e.g., a second UE 120), wherein the message indicates a first set of sidelink CSI reference signal (CSI-RS) resources to be used by the UE for CSI-RS transmission; means for transmitting a first set of CSI-RSs in the first set of sidelink CSI-RS resources (e.g., using antenna 252, DEMOD 254, MIMO detector 256, receive processor 258, controller/processor 280, memory 282, and/or the like); means for receiving an indication of one or more MCSs for sidelink communications between the UE and the other UE based at least in part on transmitting the first set of CSI-RSs (e.g., using antenna 252, DEMOD 254, MIMO detector 256, receive processor 258, controller/processor 280, memory 282, and/or the like); means for communicating with the other UE using an MCS of the one or more MCSs (e.g., using controller/processor 280, transmit processor 264, TX MIMO processor 266, MOD 254, antenna 252, memory 282, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE (e.g., UE 120), a message that triggers aperiodic CSI reporting for sidelink communications between the UE and another UE (e.g., a second UE 120), wherein the message indicates a first set of sidelink CSI-RS resources to be used by the UE for CSI-RS transmission (e.g., using controller/processor 240, transmit processor 220, TX MIMO processor 230, MOD 232, antenna 234, memory 242, and/or the like); means for receiving a sidelink aperiodic CSI report for sidelink communications between the UE and the other UE (e.g., using antenna 234, DEMOD 232, MIMO detector 236, receive processor 238, controller/processor 240, memory 242, and/or the like); means for transmitting, to at least one of the UE or the other UE, an indication of one or more MCSs for sidelink communications between the UE and the other UE based at least in part on receiving the sidelink aperiodic CSI report (e.g., using controller/processor 240, transmit processor 220, TX MIMO processor 230, MOD 232, antenna 234, memory 242, and/or the like); and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
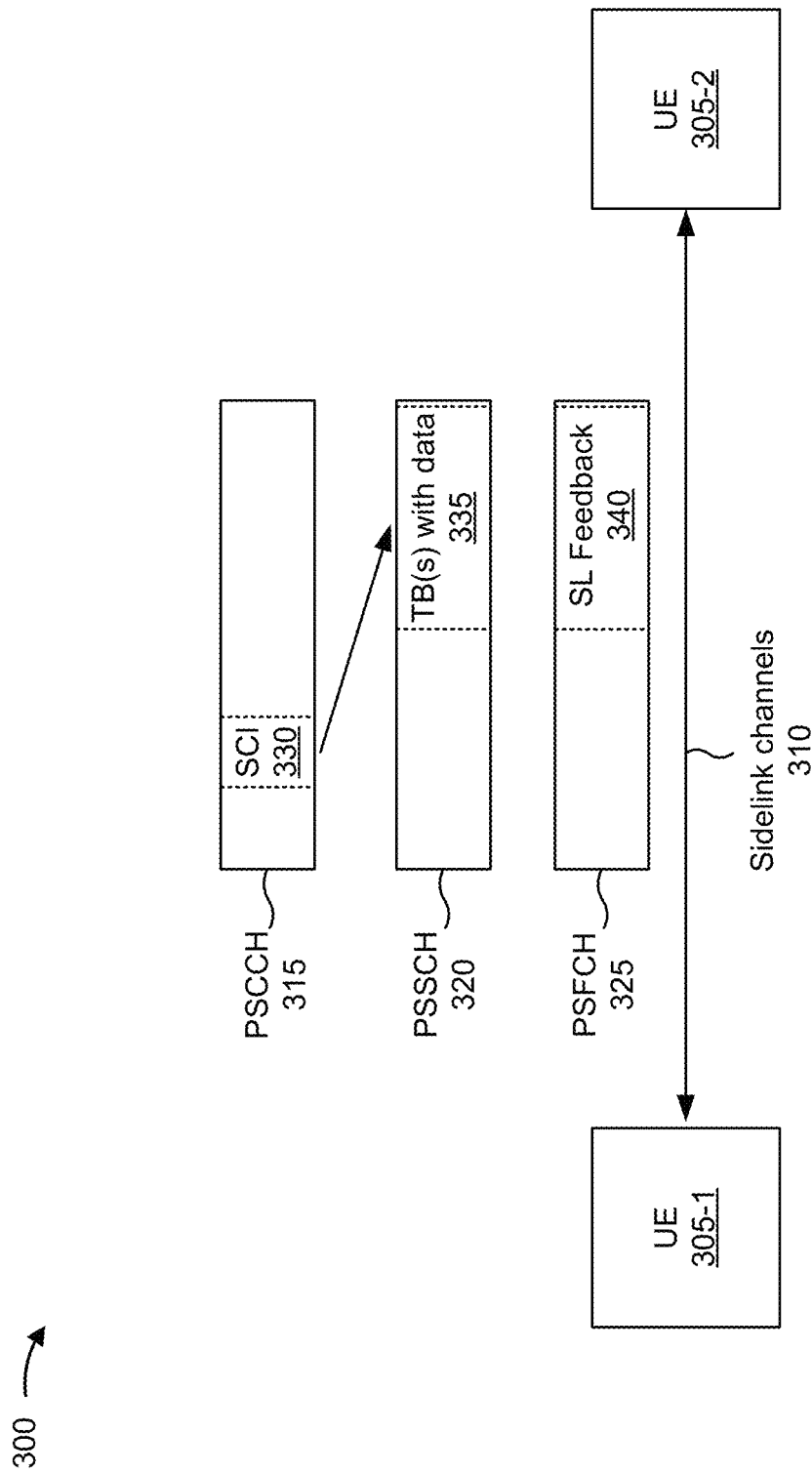
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, one of the UEs (e.g., one of UE 305-1 or UE 305-2) is a UE (sometimes referred to as a remote UE) for which communications are relayed by a relay UE, and the other one of the UEs (e.g., the other one of UE 305-1 or UE 305-2) is the relay UE, as described in more detail elsewhere herein. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
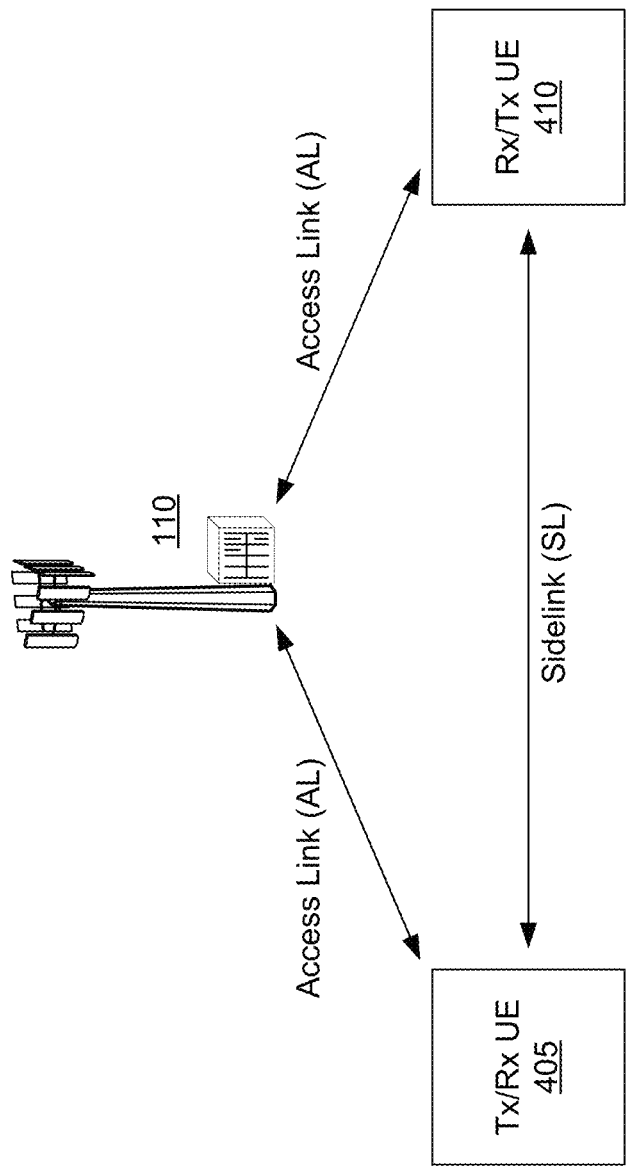
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. In some aspects, one of the Tx UE 405 or the Rx UE 410 is a UE (sometimes referred to as a remote UE) for which communications are relayed by a relay UE, and the other one of the Tx UE 405 or the Rx UE 410 is the relay UE, as described in more detail elsewhere herein. Thus, "sidelink" may refer to a direct link between UEs 120, and "access link" may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
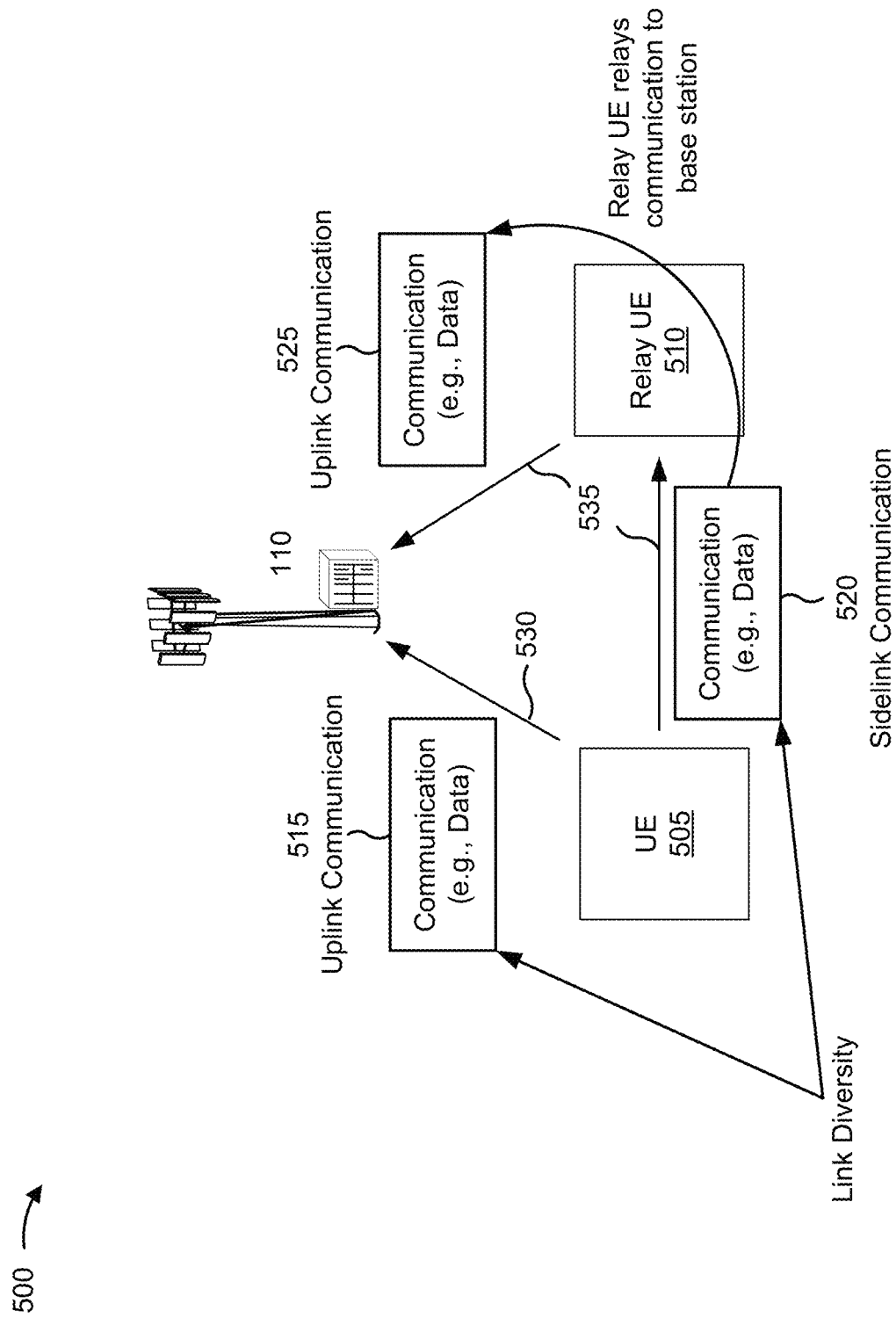
FIG. 5 is a diagram illustrating an example of a relay UE that relays communications between a UE and a base station, in accordance with the present disclosure.

FIG. 5 is a diagram illustrating an example 500 of a relay UE that relays communications between a UE and a base station, in accordance with the present disclosure. As shown, example 500 includes a UE 505, a relay UE 510, and a base station 110. In example 500, the UE 505 is a Tx UE, and the relay UE 510 is an Rx UE, as described elsewhere herein. In some aspects, the UE 505 is one UE 120, and the relay UE 510 is another UE 120. In some aspects, the UE 505 may be referred to as a remote UE.

As shown in FIG. 5, the UE 505 may transmit a communication (e.g., data, control information, and/or the like) directly to the base station 110 as an uplink communication 515. Additionally, or alternatively, the UE 505 may transmit a communication (e.g., data, control information, and/or the like) indirectly to the base station 110 via the relay UE 510. For example, the UE 505 may transmit the communication to the relay UE 510 as a sidelink communication 520, and the relay UE 510 may relay (e.g., forward, transmit, and/or the like) the communication to the base station 110 as an uplink communication 525.

In some aspects, the UE 505 may communicate directly with the base station 110 via a direct link 530. For example, the uplink communication 515 may be transmitted via the direct link 530. A communication transmitted via the direct link 530 between the UE 505 and the base station 110 (e.g., in the uplink communication 515) does not pass through and is not relayed by the relay UE 510. In some aspects, the UE 505 may communicate indirectly with the base station 110 via an indirect link 535. For example, the sidelink communication 520 and the uplink communication 525 may be transmitted via different segments of the indirect link 535. A communication transmitted via the indirect link 535 between the UE 505 and the base station 110 (e.g., in the sidelink communication 520 and the uplink communication 525) passes through and is relayed by the relay UE 510.

Using the communication scheme shown in FIG. 5 may improve network performance and increase reliability by providing the UE 505 with link diversity for communicating with the base station 110. For millimeter wave (e.g., frequency range 2, or FR2) communications, which are susceptible to link blockage and link impairment, this link diversity may improve reliability and prevent multiple retransmissions of data that may otherwise be retransmitted in order to achieve a successful communication. However, techniques described herein are not limited to millimeter wave communications, and may be used for sub-6 gigahertz (e.g., frequency range 1, or FR1) communications.

In some cases, the UE 505 may transmit a communication (e.g., the same communication) to the base station 110 via both the direct link 530 and the indirect link 535. In other cases, the UE 505 may select one of the links (e.g., either the direct link 530 or the indirect link 535), and may transmit a communication to the base station 110 using only the selected link. Alternatively, the UE 505 may receive an indication of one of the links (e.g., either the direct link 530 or the indirect link 535), and may transmit a communication to the base station 110 using only the indicated link. The indication may be transmitted by the base station 110 and/or the relay UE 510. In some aspects, such selection and/or indication may be based at least in part on channel conditions, link reliability, and/or the like.

As indicated above, FIG. 5 is provided as an example. Other examples may differ from what is described with respect to FIG. 5.

Figure 6:
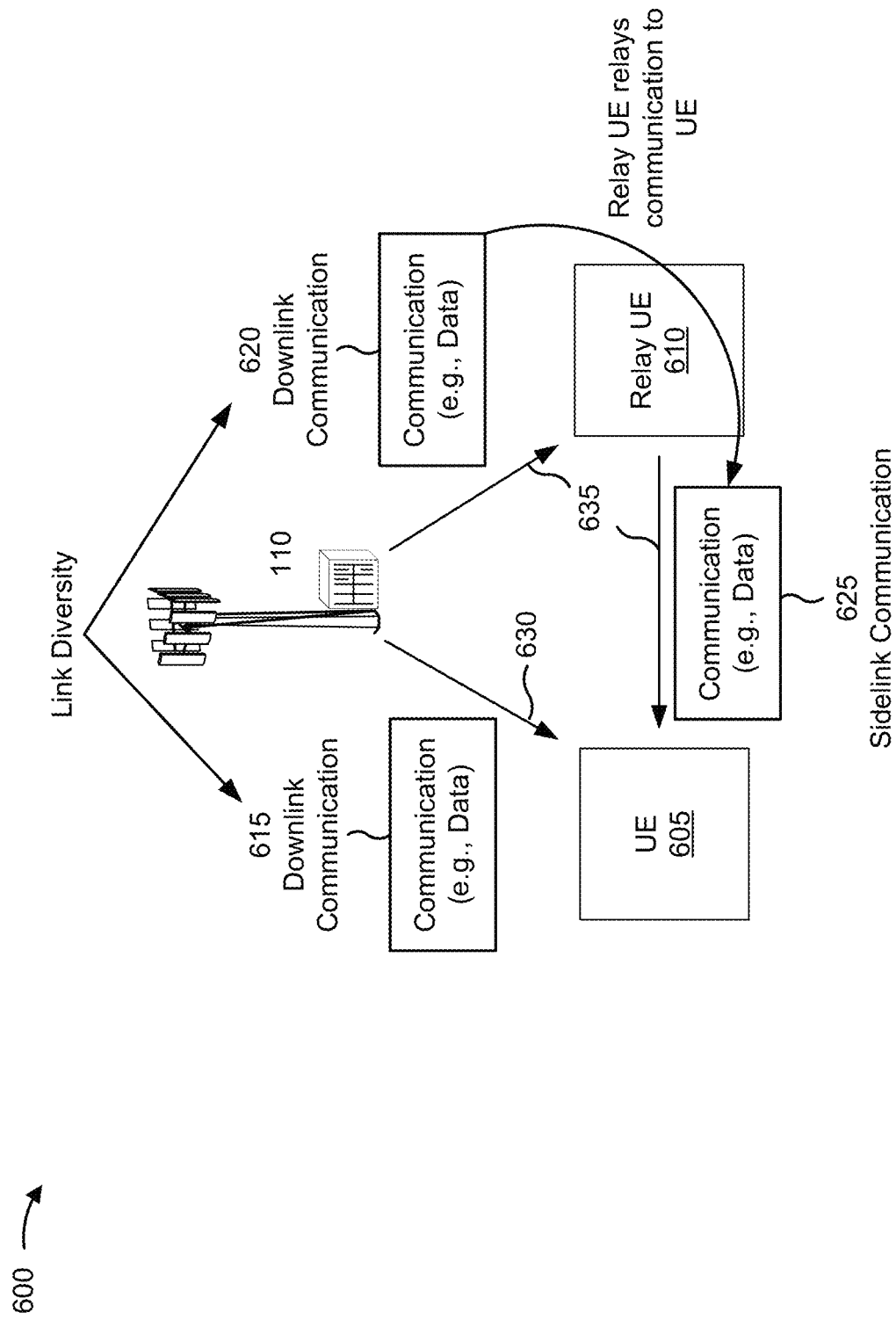
FIG. 6 is a diagram illustrating another example of a relay UE that relays communications between a UE and a base station, in accordance with the present disclosure.

FIG. 6 is a diagram illustrating an example 600 of a relay UE that relays communications between a UE and a base station, in accordance with the present disclosure. As shown, example 600 includes a UE 605, a relay UE 610, and a base station 110. In example 600, the UE 605 is an Rx UE, and the relay UE 610 is a Tx UE. In some aspects, the UE 605 is one UE 120, and the relay UE 610 is another UE 120. In some aspects, the UE 605 may be referred to as a remote UE.

As shown in FIG. 6, the UE 605 may receive a communication (e.g., data, control information, and/or the like) directly from the base station 110 as a downlink communication 615. Additionally, or alternatively, the UE 605 may receive a communication (e.g., data, control information, and/or the like) indirectly from the base station 110 via the relay UE 610. For example, the base station 110 may transmit the communication to the relay UE 610 as a downlink communication 620, and the relay UE 610 may relay (e.g., forward, transmit, and/or the like) the communication to the UE 605 as a sidelink communication 625.

In some aspects, the UE 605 may communicate directly with the base station 110 via a direct link 630. For example, the downlink communication 615 may be transmitted via the direct link 630. A communication transmitted via the direct link 630 between the UE 605 and the base station 110 (e.g., in the downlink communication 615) does not pass through and is not relayed by the relay UE 610. In some aspects, the UE 605 may communicate indirectly with the base station 110 via an indirect link 635. For example, the downlink communication 620 and the sidelink communication 625 may be transmitted via different segments of the indirect link 635. A communication transmitted via the indirect link 635 between the UE 605 and the base station 110 (e.g., in the downlink communication 620 and the sidelink communication 625) passes through and is relayed by the relay UE 610. As described above in connection with FIG. 5, using the communication scheme shown in FIG. 6 may improve network performance and increase reliability by providing the UE 605 with link diversity for communicating with the base station 110.

In some cases, the UE 605 may receive a communication (e.g., the same communication) from the base station 110 via both the direct link 630 and the indirect link 635. In other cases, the base station 110 may select one of the links (e.g., either the direct link 630 or the indirect link 635), and may transmit a communication to the UE 605 using only the selected link. Alternatively, the base station 110 may receive an indication of one of the links (e.g., either the direct link 630 or the indirect link 635), and may transmit a communication to the UE 605 using only the indicated link. The indication may be transmitted by the UE 605 and/or the relay UE 610. In some aspects, such selection and/or indication may be based at least in part on channel conditions, link reliability, and/or the like.

As indicated above, FIG. 6 is provided as an example. Other examples may differ from what is described with respect to FIG. 6.

Figure 7:
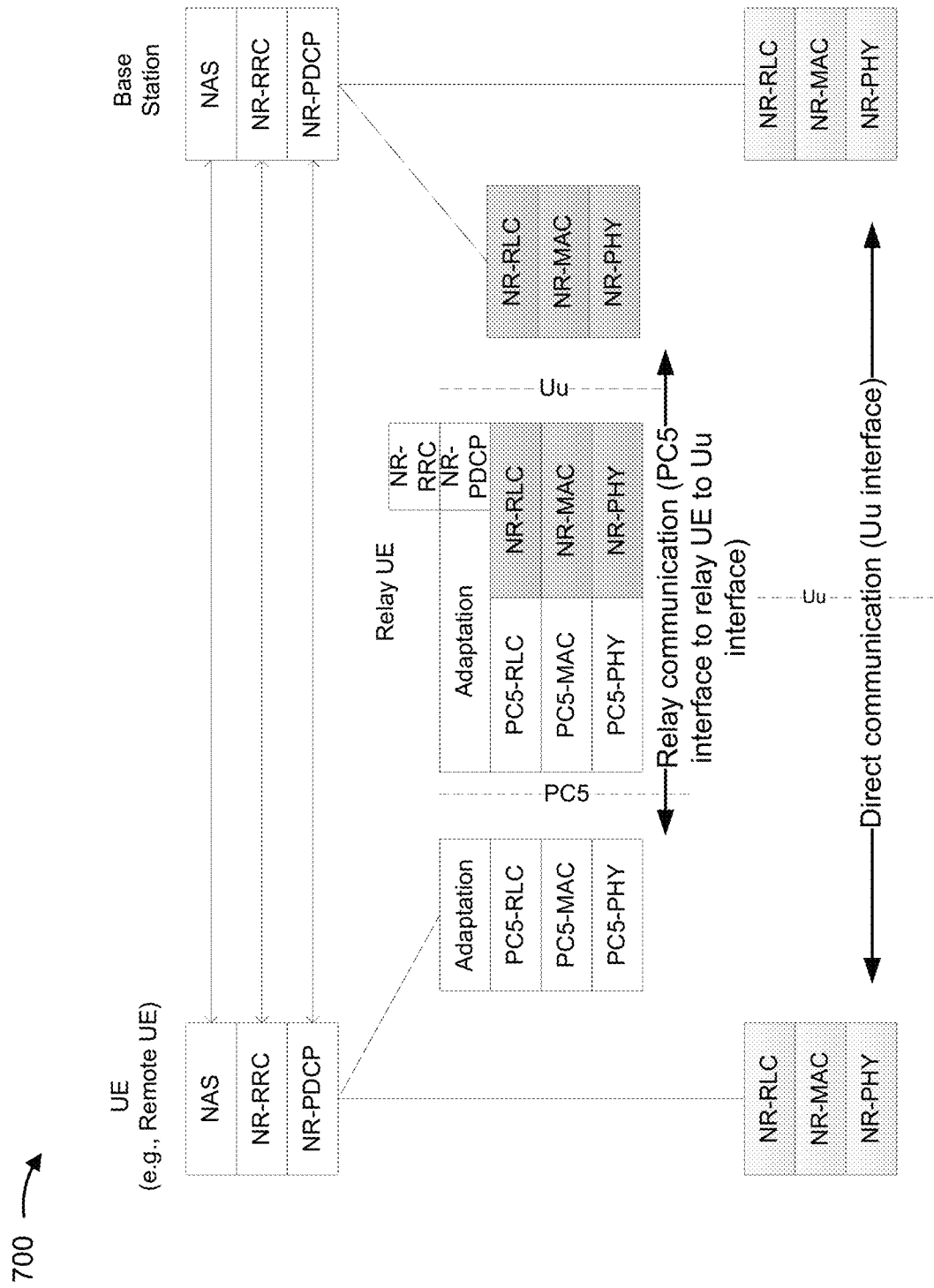
FIG. 7 is a diagram illustrating an example of a protocol stack for relaying communications between a UE and a base station via a relay UE that uses layer 2 relaying, in accordance with the present disclosure.

FIG. 7 is a diagram illustrating an example 700 of a protocol stack for relaying communications between a UE and a base station via a relay UE that uses layer 2 relaying, in accordance with the present disclosure.

As shown in FIG. 7, an NR protocol stack implemented on a UE (e.g., a remote UE or a relay UE) and on a base station includes a non-access stratum (NAS) layer, a radio resource control (RRC) layer, a packet data convergence protocol (PDCP) layer, and/or the like. As further shown in FIG. 7, the layers of the NR protocol stacks of the UE and the base station may correspond to each other. The PDCP layer may be layer 2 in the NR protocol stack and may include multiple sub-layers. For example, the PDCP layer may include a radio link control (RLC) sub-layer, a medium access control (MAC) sub-layer, a physical (PHY) sub-layer, and/or the like. In some aspects, the PDCP layer on a UE (e.g., a remote UE or a relay UE) may include an adaptation sub-layer (e.g., a service data adaptation protocol (SDAP) sub-layer) and/or the like.

When communicating directly with a base station (e.g., via a Uu interface), a UE (e.g., a remote UE) may communicate at an NR-RLC sub-layer, an NR-MAC sub-layer, and an NR-PHY layer. As shown in FIG. 7, the sub-layers in the UE may communicate with corresponding sub-layers in the base station. However, in a relay scenario, the UE may communicate via a PC5 interface (or another sidelink interface) with a relay UE. For example, the UE may include a PC5-RLC sub-layer, a PC5-MAC sub-layer, and a PC5-PHY sub-layer to communicate with a corresponding PC5-RLC sub-layer, PC5-MAC sub-layer, and PC5-PHY sub-layer of the relay UE. The relay UE may also include an NR-RLC sub-layer, an NR-MAC sub-layer, and an NR-PHY sub-layer to communicate via a Uu interface with corresponding sub-layers of the base station. The adaptation layer of the NR protocol stack on the UE may adapt communications from the NR protocol to the PC5 protocol. Based at least in part on passing information between PC5 sub-layers and NR sub-layers, the relay UE enables layer 2 relaying between the UE and the base station.

For aperiodic channel state information (CSI) reporting for sidelink communications, a Tx UE may transmit an aperiodic CSI request to an Rx UE, and may transmit one or more CSI reference signals (CSI-RSs). The Rx UE may measure the CSI-RS(s) to calculate CSI, which may include a channel quality indicator (CQI) value, a precoding matrix indicator (PMI) value, a rank indicator (RI) value, a signal to interference plus noise ratio (SINR) value, a reference signal received power (RSRP) value, and/or the like. The Rx UE may transmit a CSI report to the Tx UE (e.g., in a medium access control (MAC) control element) to indicate the CSI calculated by the Rx UE. The Tx UE may determine one or more transmission parameters for a sidelink communication to be transmitted to the Rx UE based at least in part on the CSI. The one or more transmission parameters may include, for example, a modulation and coding scheme (MCS), a transport block (TB) size, a resource allocation, a transmit power, and/or the like.

However, in a sidelink transmission mode where a base station assists with scheduling and/or controlling sidelink communications, the aperiodic CSI reporting procedure described above does not enable the base station to assist with selection or control of the transmission parameter(s). As a result, one or more base station objectives may not be satisfied. For example, a base station may be unable to control a packet error rate (PER) associated with communications between the base station and a UE, and thus may not be capable of satisfying a target PER using the aperiodic CSI reporting procedure described above. Some techniques and apparatuses described herein enable a base station to satisfy one or more base station objectives and trigger sidelink aperiodic CSI reporting to assist with scheduling and/or controlling sidelink communications between a UE and a relay UE based at least in part on an aperiodic CSI report.

As indicated above, FIG. 7 is provided as an example. Other examples may differ from what is described with respect to FIG. 7.

Figure 8:
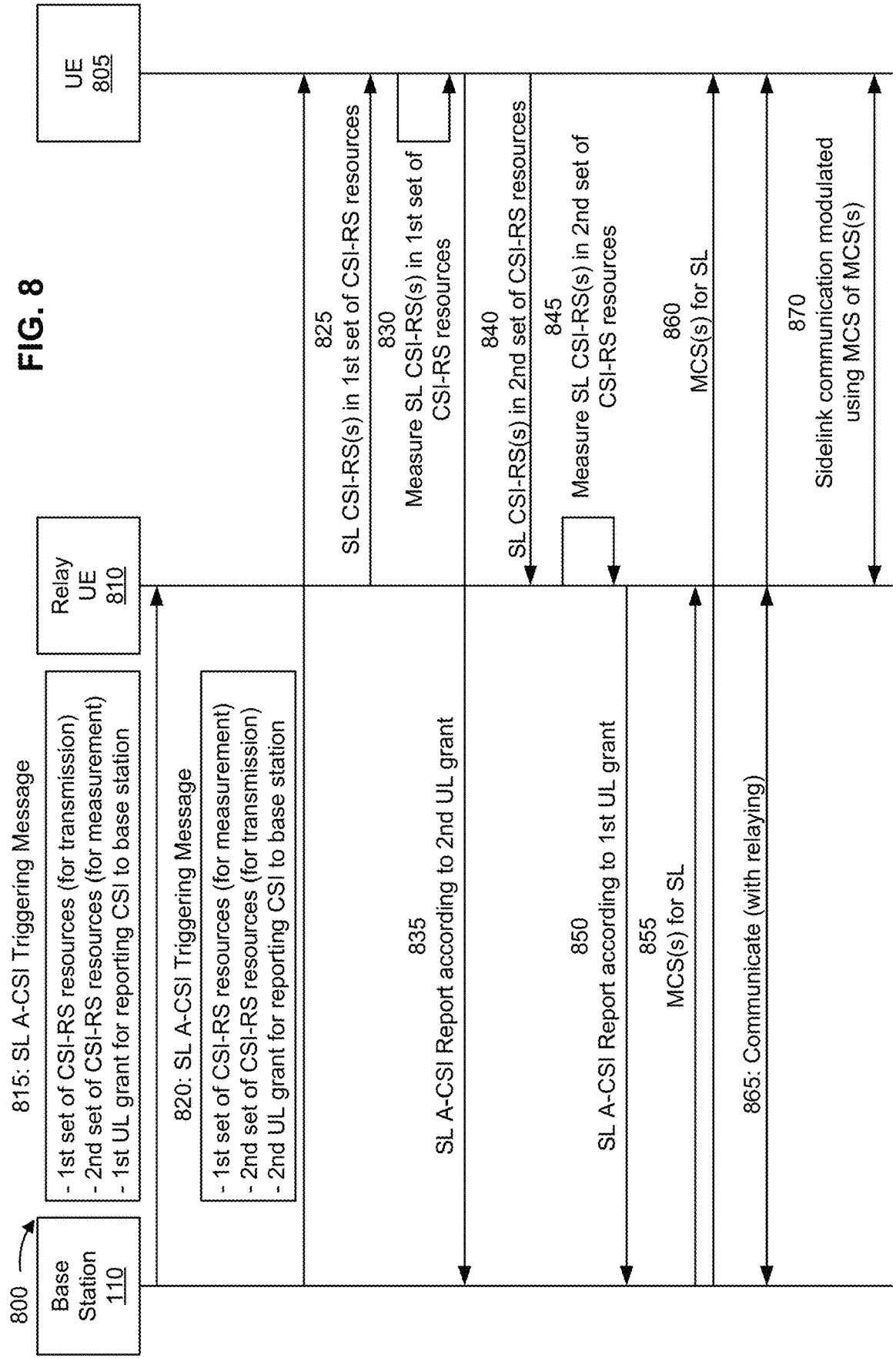
FIG. 8 is a diagram illustrating an example of aperiodic channel state information (CSI) reporting and modulation and coding scheme (MCS) control triggered by a base station, in accordance with the present disclosure.

FIG. 8 is a diagram illustrating an example 800 of aperiodic CSI reporting and MCS control triggered by a base station, in accordance with the present disclosure. As shown in FIG. 8, a base station 110, a UE 805, and a relay UE 810 may communicate with one another. The UE 805 and the relay UE 810 may communicate with one another via a sidelink. The base station 110 and the relay UE 810 may communicate with one another via an access link. The UE 805 and the base station 110 may communicate with one another via a direct link (e.g., an access link, such as when communications between the UE 805 and the base station 110 are not relayed by the relay UE 810) and/or via an indirect link (e.g., an access link and a sidelink, such as when communications between the UE 805 and the base station 110 are relayed by the relay UE 810). In some aspects, the UE 805 and/or the relay UE 810 may be a UE described elsewhere herein in connection with FIGS. 1-7. For example, the relay UE 810 may be configured to relay communications between the base station 110 and the UE 805. In some aspects, the relay UE 810 provides a layer 2 relay service for the UE 805, as described above in connection with FIG. 7. In example 800, the relay UE 810 may be a Tx UE and the UE 805 may be an Rx UE, or the relay UE 810 may be an Rx UE and the UE 805 may be a Tx UE.

As shown by reference number 815, the base station 110 may transmit a sidelink (SL) aperiodic CSI (A-CSI) triggering message to the relay UE 810, such as a downlink control information (DCI) message and/or the like. The SL A-CSI triggering message may indicate a first set of CSI-RS resources for transmitting CSI-RSs to the UE 805 to enable the UE 805 to measure the CSI-RSs for calculating CSI for sidelink communications. For example, the SL A-CSI triggering message may include a request for the relay UE 810 to calculate CSI on a sidelink channel between the relay UE 810 and the UE 805 (e.g., by transmitting CSI-RSs on the first set of CSI-RS resources to the UE 805 for measurement) and for the UE 805 to report the calculated CSI.

Additionally, or alternatively, the SL A-CSI triggering message may indicate a second set of CSI-RS resources for measuring CSI-RSs received from another UE (e.g., UE 805) to enable relay UE 810 to calculate CSI for sidelink communications. The base station 110 may indicate the second set of CSI-RS resources in a message that is separate from the SL A-CSI triggering message. In some aspects, the SL A-CSI triggering message or the separate message may indicate only the first set of CSI-RS resources. In some aspects, the SL A-CSI triggering message or the separate message may indicate only the second set of CSI-RS resources. In some aspects, as shown in FIG. 8, the SL A-CSI triggering message or the separate message may indicate both the first set of CSI-RS resources and the second set of CSI-RS resources.

In some aspects, the SL A-CSI triggering message may instruct the relay UE 810 to report the calculated CSI (e.g., in an SL A-CSI report) to the base station 110, as described below. The SL A-CSI triggering message may include an uplink grant or otherwise indicate one or more uplink resources that the relay UE 810 may use to transmit the SL A-CSI report to the base station 110.

Additionally, or alternatively, the SL A-CSI triggering message may instruct the relay UE 810 to report the calculated CSI (e.g., in an SL A-CSI report) to the UE 805, as described in connection with FIG. 9. In some aspects, the SL A-CSI triggering message may instruct the relay UE 810 to report the calculated CSI (e.g., in an SL A-CSI report) to both the base station 110 and the UE 805.

As shown by reference number 820, the base station 110 may transmit an SL A-CSI triggering message to the UE 805, such as a DCI message and/or the like. The SL A-CSI triggering message may indicate the first set of CSI-RS resources for receiving CSI-RSs from the relay UE 810 to enable the UE 805 to measure the CSI-RSs for calculating CSI for sidelink communications. For example, the SL A-CSI triggering message may include a request for the UE 805 to calculate CSI on a sidelink channel between the UE 805 and the relay UE 810 (e.g., by measuring CSI-RSs on the first set of CSI-RS resources transmitted from the relay UE 810 to the UE 805) and for the UE 805 to report the calculated CSI.

Additionally, or alternatively, the SL A-CSI triggering message may indicate the second set of CSI-RS resources for transmitting CSI-RSs to another UE (e.g., relay UE 810) to enable the other UE to measure the CSI-RSs for calculating CSI for sidelink communications. The base station 110 may indicate the second set of CSI-RS resources in a message that is separate from the SL A-CSI triggering message. In some aspects, the SL A-CSI triggering message or the separate message may indicate only the first set of CSI-RS resources. In some aspects, the SL A-CSI triggering message or the separate message may indicate only the second set of CSI-RS resources. In some aspects, as shown in FIG. 8, the SL A-CSI triggering message or the separate message may indicate both the first set of CSI-RS resources and the second set of CSI-RS resources.

In some aspects, the SL A-CSI triggering message may instruct the UE 805 to report the calculated CSI (e.g., in an SL A-CSI report) to the base station 110, as described below. The SL A-CSI triggering message may include an uplink grant or otherwise indicate one or more uplink resources that the UE 805 may use to transmit the SL A-CSI report to the base station 110.

Additionally, or alternatively, the SL A-CSI triggering message may instruct the UE 805 to report the calculated CSI (e.g., in an SL A-CSI report) to the relay UE 810, as described below in connection with FIG. 9. In some aspects, the SL A-CSI triggering message may instruct the UE 805 to report the calculated CSI (e.g., in an SL A-CSI report) to both the base station 110 and the relay UE 810.

As shown by reference number 825, and based at least in part on receiving the SL A-CSI triggering message from base station 110, the relay UE 810 may transmit, to the UE 805, a first set of CSI-RSs in the first set of CSI-RS resources. As shown in FIG. 8, the first set of CSI-RS resources may be sidelink resources such that the relay UE 810 transmits the first set of CSI-RSs on a sidelink channel to the UE 805. In some aspects, the first set of CSI-RS resources that carry the first set of CSI-RSs are indicated in the SL A-CSI triggering message from the base station 110. In some aspects, the relay UE 810 may not transmit the first set of CSI-RSs, such as when the SL A-CSI triggering message indicates the second set of CSI-RS resources but does not indicate the first set of CSI-RS resources.

As shown by reference number 830, and based at least in part on receiving the first set of CSI-RSs transmitted by the relay UE 810 and/or receiving the SL A-CSI triggering message from base station 110, the UE 805 may measure the first set of CSI-RSs transmitted by the relay UE 810 in the first set of CSI-RS resources (e.g., on a sidelink channel). The UE 805 may calculate CSI for the sidelink channel based at least in part on measuring the first set of CSI-RSs. The calculated CSI may include, for example, a CQI value, a PMI value, an RI value, a SINR value, an RSRP value, and/or the like. In some aspects, the UE 805 may not measure the first set of CSI-RSs, such as when the SL A-CSI triggering message indicates the second set of CSI-RS resources but does not indicate the first set of CSI-RS resources.

As shown by reference number 835, the UE 805 may transmit an SL A-CSI report to the base station 110 based at least in part on measuring the first set of CSI-RSs. The SL A-CSI report may include the CSI calculated by the UE 805 for a sidelink channel (e.g., with the relay UE 810), as described above. In some aspects, the UE 805 may transmit the SL A-CSI report to the base station 110 based at least in part on an indication (e.g., from the base station 110 and/or the relay UE 810) that the SL A-CSI report is to be transmitted to the base station 110. For example, the indication may be included in the SL A-CSI triggering message from the base station 110 (e.g., a radio resource control (RRC) message), a configuration message from the relay UE 810, and/or the like.

In some aspects, the UE 805 may transmit the SL A-CSI report to the base station 110 in accordance with a wireless communication standard. The UE 805 may transmit the SL A-CSI report to the base station 110 in a medium access control (MAC) control element (CE) (MAC-CE), in a MAC payload, in uplink control information (UCI), and/or the like. In some aspects, the UE 805 may transmit the SL A-CSI report according to an uplink resource indicated in the SL A-CSI triggering message or in a separate message from the base station 110. In some aspects, the UE 805 may transmit the SL A-CSI report to the relay UE 810 in addition to the base station 110, as described below in connection with FIG. 9. In some aspects, the UE 805 may not transmit the SL A-CSI report, such as when the SL A-CSI triggering message indicates the second set of CSI-RS resources but does not indicate the first set of CSI-RS resources.

As shown by reference number 840, and based at least in part on receiving the SL A-CSI triggering message from base station 110, the UE 805 may transmit, to the relay UE 810, a second set of CSI-RSs in the second set of CSI-RS resources. As shown in FIG. 8, the second set of CSI-RS resources may be sidelink resources such that the UE 805 transmits the second set of CSI-RSs on a sidelink channel to the relay UE 810. In some aspects, the second set of CSI-RS resources that carry the second set of CSI-RSs are indicated in the SL A-CSI triggering message from the base station 110. In some aspects, the UE 805 may not transmit the second set of CSI-RSs, such as when the SL A-CSI triggering message indicates the first set of CSI-RS resources but does not indicate the second set of CSI-RS resources.

As shown by reference number 845, and based at least in part on receiving the second set of CSI-RSs transmitted by the UE 805 and/or receiving the SL A-CSI triggering message from base station 110, the relay UE 810 may measure the second set of CSI-RSs transmitted by the UE 805 (e.g., on a sidelink channel) in the second set of CSI-RS resources. The relay UE 810 may calculate CSI for the sidelink channel based at least in part on measuring the second set of CSI-RSs. The calculated CSI may include, for example, a CQI value, a PMI value, an RI value, a SINR value, an RSRP value, and/or the like. In some aspects, the relay UE 810 may not measure the second set of CSI-RSs, such as when the SL A-CSI triggering message indicates the first set of CSI-RS resources but does not indicate the second set of CSI-RS resources.

As shown by reference number 850, the relay UE 810 may transmit an SL A-CSI report to the base station 110 based at least in part on measuring the second set of CSI-RSs. The SL A-CSI report may include the CSI calculated by the relay UE 810 for a sidelink channel (e.g., with the UE 805), as described above. In some aspects, the relay UE 810 may transmit the SL A-CSI report to the base station 110 based at least in part on an indication (e.g., from the base station 110 and/or the UE 805) that the SL A-CSI report is to be transmitted to the base station 110. For example, the indication may be included in the SL A-CSI triggering message from the base station 110 (e.g., a radio resource control (RRC) message), a configuration message from the UE 805, and/or the like.

In some aspects, the relay UE 810 may transmit the SL A-CSI report to the base station 110 in accordance with a wireless communication standard. The relay UE 810 may transmit the SL A-CSI report to the base station 110 in a MAC-CE, in a MAC payload, in UCI, and/or the like. In some aspects, the relay UE 810 may transmit the SL A-CSI report according to an uplink resource indicated in the SL A-CSI triggering message or in a separate message from the base station 110. In some aspects, the relay UE 810 may transmit the SL A-CSI report to the UE 805 in addition to the base station 110, as described below in connection with FIG. 9. In some aspects, the relay UE 810 may not transmit the SL A-CSI report, such as when the SL A-CSI triggering message indicates the first set of CSI-RS resources but does not indicate the second set of CSI-RS resources.

In some aspects, the SL A-CSI triggering messages may include only the first set of CSI-RS resources or only the second set of CSI-RS resources. Accordingly, in some aspects, only one of the relay UE 810 or the UE 805 may transmit the first set of CSI-RSs or the second set of CSI-RSs, respectively, and only the other of the UE 805 or the relay UE 810 may measure the first set of CSI-RSs or the second set of CSI-RSs, respectively, and generate a SL A-CSI report.

As shown by reference number 855, the base station 110 may transmit an indication of one or more MCSs (e.g., a single MCS or two or more MCSs), for sidelink communications between the relay UE 810 and the UE 805, to the relay UE 810. The base station 110 may determine (e.g., identify, select, and/or the like) the one or more MCSs based at least in part on receiving the SL A-CSI report from the relay UE 810, the SL A-CSI report from the UE 805, or a combination thereof. The relay UE 810 may receive the indication from the base station 110 based at least in part on transmitting the first set of CSI-RSs.

In some aspects, the base station 110 may determine the one or more MCSs based at least in part on a configuration of the base station 110. For example, the base station 110 may determine the one or more MCSs based at least in part on a base station objective (e.g., a rule or objective stored in memory of the base station 110). In some aspects, the base station 110 may determine the one or more MCSs in order to satisfy one or more base station objectives, such as a target PER, a target block error rate (BLER), and/or the like.

In some aspects, the base station 110 may determine a single MCS, and may indicate the single MCS to the relay UE 810. In some aspects, the base station 110 may determine multiple MCSs, and may indicate the multiple MCSs to the relay UE 810. For example, the base station 110 may determine a range of MCSs (e.g., a range of MCS index values), and may indicate the range of MCSs to the relay UE 810. In some aspects, the base station 110 may transmit (e.g., relay or forward) the SL A-CSI report, received from the UE 805, to the relay UE 810. The base station 110 may indicate the one or more MCSs and/or may transmit the SL A-CSI report to the relay UE 810 in a MAC-CE, in a MAC payload, in DCI, in UCI, in a sidelink grant for the sidelink channel that is to carry the communication transmitted by the base station 110 and intended for the UE 805, and/or the like.

As shown by reference number 860, the base station 110 may transmit an indication of one or more MCSs, for sidelink communications between the relay UE 810 and the UE 805, to the UE 805. The base station 110 may determine (e.g., identify, select, and/or the like) the one or more MCSs based at least in part on receiving the SL A-CSI report from the relay UE 810, the SL A-CSI report from the UE 805, or a combination thereof. The UE 805 may receive the indication from the base station 110 based at least in part on transmitting the second set of CSI-RSs.

In some aspects, the base station 110 may determine the one or more MCSs based at least in part on a configuration of the base station 110. For example, the base station 110 may determine the one or more MCSs based at least in part on a base station objective (e.g., a rule or objective stored in memory of the base station 110). In some aspects, the base station 110 may determine the one or more MCSs in order to satisfy one or more base station objectives, such as a target PER, a target block error rate (BLER), and/or the like.

In some aspects, the base station 110 may determine a single MCS, and may indicate the single MCS to the UE 805. In some aspects, the base station 110 may determine multiple MCSs, and may indicate the multiple MCSs to the UE 805. For example, the base station 110 may determine a range of MCSs (e.g., a range of MCS index values), and may indicate the range of MCSs to the UE 805. In some aspects, the base station 110 may transmit (e.g., relay or forward) the SL A-CSI report, received from the relay UE 810, to the UE 805. The base station 110 may indicate the one or more MCSs and/or may transmit the SL A-CSI report to the UE 805 in a MAC-CE, in a MAC payload, in DCI, in UCI, in a sidelink grant for the sidelink channel that is to carry the communication transmitted by the base station 110 and intended for the UE 805, and/or the like.

In some aspects, the base station 110 may send the one or more MCSs only to the relay UE 810 or only to the UE 805. Accordingly, in some aspects, only one of the relay UE 810 or the UE 805 may select from multiple MCSs indicated by the base station 110 and transmit a configuration message indicating the selected MCS to the other of the relay UE 810 or the UE 805. For example, the relay UE 810 may identify an MCS to be used for relaying the communication, received from the base station 110 and intended for the UE 805, to the UE 805. The MCS may be used for a sidelink channel that includes the communication (e.g., the control information, the data, and/or the like). Alternatively, the UE 805 may identify an MCS to be used for relaying the communication, transmitted by the UE 805 and intended for the base station 110, to the relay UE 810. The MCS may be used for a sidelink channel that includes the communication (e.g., the control information, the data, and/or the like).

In some aspects, the base station 110 may send the one or more MCSs to both the relay UE 810 and the UE 805. Accordingly, in some aspects, the relay UE 810 and the UE 805 may cooperate in selecting from multiple MCSs indicated by the base station 110 and exchange configuration messages indicating the selected MCS to each other. For example, the relay UE 810 and the UE 805 may each identify one or more MCSs to be used for relaying the communication, received from the base station 110 and intended for the UE 805, and transmit the one or more identified MCSs to each other. For example, when the one or more MCSs include a plurality of MCSs (e.g., two or more MCSs, three or more MCSs, etc.), the relay UE 810 and/or the UE 805 may select an MCS from the plurality of MCSs. The relay UE 810 and the UE 805 may each confirm a selection from the one or more identified MCSs, and exchange messages confirming the selections with each other. The selected MCS may be used for a sidelink channel that includes the communication (e.g., the control information, the data, and/or the like). In some cases, selection by the relay UE 810 can include selection by the UE 805, transmission by the UE 805 of the selected MCS, and confirmation by the relay UE 810 of the selection. Similarly, selection by the UE 805 can include selection by the relay UE 810, transmission by the relay UE 810 of the selected MCS, and confirmation by the UE 805 of the selection.

As shown, if the base station 110 indicates a single MCS to the relay UE 810 (as described in connection with reference number 855), then the relay UE 810 may use the single MCS (e.g., the indicated MCS) for the sidelink channel (e.g., to modulate and/or encode the sidelink communication). As also shown, if the base station 110 indicates multiple MCSs (e.g., a range of MCSs) to the relay UE 810, then the relay UE 810 may select an MCS, of the multiple MCSs, and may use the selected MCS for the sidelink channel. In some aspects, the relay UE 810 may select the MCS based at least in part on the SL A-CSI report, which may be received from the UE 805 and/or the base station 110.

Additionally, or alternatively, if the base station 110 indicates a single MCS to the UE 805 (as described in connection with reference number 860), then the UE 805 may use the single MCS (e.g., the indicated MCS) for the sidelink channel (e.g., to modulate and/or encode the sidelink communication). Alternatively, if the base station 110 indicates multiple MCSs (e.g., a range of MCSs) to the UE 805, then the UE 805 may select an MCS, of the multiple MCSs, and may use the selected MCS for the sidelink channel. In some aspects, the UE 805 may select the MCS based at least in part on the SL A-CSI report, which may be received from the relay UE 810 and/or the base station 110.

In some aspects, based at least in part on receiving the indication of one or more MCSs from the base station 110, the relay UE 810 may transmit sidelink control information (SCI) to the UE 805 to schedule sidelink communication. In this case, the relay UE 810 may indicate the identified MCS, to be used for the sidelink communication, in the SCI. In some aspects, the relay UE 810 may not transmit the SCI, in which case the UE 805 may use blind demodulation and/or blind decoding for the sidelink communication (e.g., by testing multiple MCS hypotheses).

As shown by reference number 865, the base station 110 may transmit a communication (e.g., data, control information, and/or the like), intended for the UE 805, to the relay UE 810. In some aspects, the base station 110 may indicate, to the relay UE 810, that the communication is to be relayed to the UE 805. For example, the base station 110 may use DCI, that schedules the communication, to indicate that the communication is to be relayed to the UE 805. Additionally, or alternatively, the communication may include a header or other information that indicates that the communication is to be relayed to the UE 805.

As further shown by reference number 865, in some aspects, the base station 110 may also transmit the communication (e.g., the same data, the same control information, and/or the like) directly to the UE 805 (e.g., via a direct link and/or an access link, as described elsewhere herein). As described elsewhere herein, in some aspects, the base station 110 may transmit a communication (e.g., the same communication) to the UE 805 via both a direct link and an indirect link to improve link diversity. Alternatively, the base station 110 may select one of the links (e.g., either the direct link or the indirect link), and may transmit a communication to the UE 805 using only the selected link. In some aspects, the base station 110 may receive an indication of one of the links (e.g., either the direct link or the indirect link), and may transmit a communication to the UE 805 using only the indicated link. The indication may be transmitted by the UE 805 and/or the relay UE 810. In some aspects, such selection and/or indication may be based at least in part on channel conditions, channel measurements (e.g., a comparison of SL A-CSI and access link CSI, such as downlink A-CSI), link reliability, and/or the like.

As shown by reference number 870, based at least in part on receiving the communication intended for the UE 805 from the base station 110, the relay UE 810 may relay the communication (e.g., the data, the control information, and/or the like) to the UE 805 via a sidelink channel. As shown, the relay UE 810 may modulate the sidelink communication using the identified MCS. The UE 805 may receive the sidelink communication and may demodulate and/or decode the sidelink communication based at least in part on the MCS to obtain the communication transmitted by the base station 110 and relayed by the relay UE 810. As described above, the MCS may be indicated to the UE 805 in SCI, or the UE 805 may perform blind demodulation and/or blind decoding using multiple MCSs.

Additionally, or alternatively, in some aspects, the relay UE 810 may function as an Rx UE. For example, the UE 805 may transmit a communication (e.g., data, control information, and/or the like), intended for the base station 110, to the relay UE 810 via a sidelink channel. As shown, the relay UE 810 may modulate the sidelink channel using the identified MCS. In some aspects, the UE 805 may indicate, to the relay UE 810, that the communication is to be relayed to the base station 110. For example, the UE 805 may use UCI, that schedules the communication, to indicate that the communication is to be relayed to the base station 110. Additionally, or alternatively, the communication may include a header or other information that indicates that the communication is to be relayed to the base station 110. Based at least in part on receiving the communication from the UE 805, the relay UE 810 may relay the communication (e.g., the data, the control information, and/or the like) to the base station 110.

Although techniques and apparatuses are described herein in connection with using an SL A-CSI report to assist a base station 110 with determining an MCS to be used for a sidelink channel that is to include a communication to be relayed from the base station 110 to the UE 805 via the relay UE 810, these techniques and apparatuses may be applied to determine one or more other transmission parameters (e.g., in addition to MCS or as an alternative to MCS). For example, the techniques and apparatuses described herein may be used to assist a base station 110 with determining a TB size, a resource allocation, a transmit power, a retransmission configuration (e.g., whether to enable or disable retransmissions or a maximum number of retransmissions, among other examples), and/or the like, to be used for a sidelink channel that is to include a communication to be relayed from the base station 110 to the UE 805 via the relay UE 810 and/or a communication to be relayed from the UE 805 to the base station 110 via the relay UE 810.

Using the aperiodic CSI reporting procedure described in connection with FIG. 8 enables the base station 110 to trigger sidelink communications as well as assist with scheduling and/or controlling of the sidelink communications by selecting and/or controlling one or more transmission parameters, such as MCS. As a result, the base station 110 may be enabled to satisfy one or more base station objectives, such as a target PER associated with communications between the base station 110 and the UE 805, a target BLER associated with communications between the base station 110 and the UE 805, and/or the like.

As indicated above, FIG. 8 is provided as an example. Other examples may differ from what is described with respect to FIG. 8.

Figure 9:
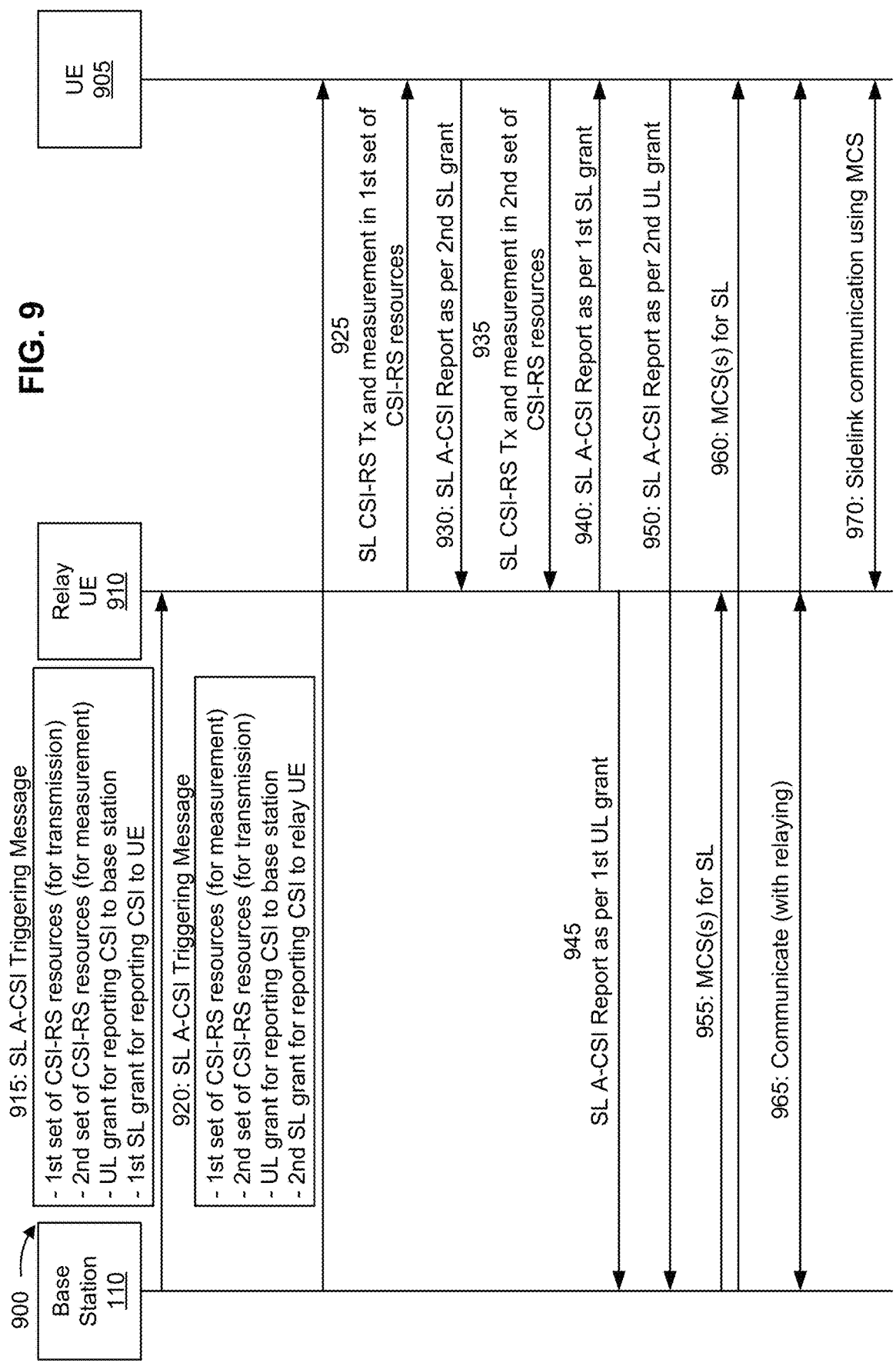
FIG. 9 is a diagram illustrating another example of aperiodic CSI reporting and MCS control triggered by a base station, in accordance with the present disclosure.

FIG. 9 is a diagram illustrating an example 900 of aperiodic CSI reporting and MCS control triggered by a base station, in accordance with the present disclosure. As shown in FIG. 9, a base station 110, a UE 905, and a relay UE 910 may communicate with one another. The UE 905 and the relay UE 910 may communicate with one another via a sidelink. The base station 110 and the relay UE 910 may communicate with one another via an access link. The UE 905 and the base station 110 may communicate with one another via a direct link (e.g., an access link, such as when communications between the UE 905 and the base station 110 are not relayed by the relay UE 910) and/or via an indirect link (e.g., an access link and a sidelink, such as when communications between the UE 905 and the base station 110 are relayed by the relay UE 910). In some aspects, the UE 905 and/or the relay UE 910 may be a UE described elsewhere herein in connection with FIGS. 1-7. For example, the relay UE 910 may be configured to relay communications between the base station 110 and the UE 905. In some aspects, the relay UE 910 provides a layer 2 relay service for the UE 905, as described above in connection with FIG. 7. In example 900, the relay UE 910 may be a Tx UE and the UE 905 may be an Rx UE, or the relay UE 910 may be an Rx UE and the UE 905 may be a Tx UE.

As shown by reference number 915, the base station 110 may transmit an SL A-CSI triggering message to the relay UE 910, as described above in connection with FIG. 8. The SL A-CSI triggering message may include an indication of a first set of CSI-RS resources for transmitting CSI-RSs to the UE 905 to enable the UE 905 to measure the CSI-RSs for calculating CSI for sidelink communications, an indication of a second set of CSI-RS resources for measuring CSI-RSs received from another UE (e.g., the UE 905) for calculating CSI for sidelink communications, an uplink grant or other indication of one or more uplink resources that the relay UE 910 may use to transmit an SL A-CSI report to the base station 110, and/or any combination thereof, as described above in connection with FIG. 8.

As shown, in some aspects, the SL A-CSI triggering message may also include a sidelink grant or otherwise indicate one or more sidelink resources that the relay UE 910 may use to transmit the SL A-CSI report to the UE 905. For example, the SL A-CSI triggering message may include a sidelink grant that indicates, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like.

As shown by reference number 920, the base station 110 may transmit an SL A-CSI triggering message to the UE 905, as described above in connection with FIG. 8. The SL A-CSI triggering message may include an indication of the first set of CSI-RS resources for measuring CSI-RSs received from another UE (e.g., the relay UE 910) for calculating CSI for sidelink communications, an indication of the second set of CSI-RS resources for transmitting CSI-RSs to the relay UE 910 to enable the UE 905 to measure the CSI-RSs for calculating CSI for sidelink communications, an uplink grant or other indication of one or more uplink resources that the UE 905 may use to transmit an SL A-CSI report to the base station 110, and/or any combination thereof, as described above in connection with FIG. 8.

As shown, in some aspects, the SL A-CSI triggering message may also include a sidelink grant or otherwise indicate one or more sidelink resources that the UE 905 may use to transmit the SL A-CSI report to the relay UE 910. For example, SL A-CSI triggering message may include a sidelink grant that indicates, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like.

As shown by reference number 925, the relay UE 910 may transmit a first set of CSI-RSs to the UE 905 in the first set of CSI-RS resources, and the UE 905 may measure the first set of CSI-RSs transmitted by the relay UE 910 in the first set of CSI-RS resources (e.g., on a sidelink channel), as described above in connection with FIG. 8. The UE 905 may calculate CSI for the sidelink channel based at least in part on measuring the first set of CSI-RSs, as described above in connection with FIG. 8. The calculated CSI may include, for example, a CQI value, a PMI value, an RI value, a SINR value, an RSRP value, and/or the like. In some aspects, the relay UE 910 may not transmit the first set of CSI-RSs, and the UE 905 may not measure the first set of CSI-RSs, such as when the SL A-CSI triggering message indicates the second set of CSI-RS resources but does not indicate the first set of CSI-RS resources.

As shown by reference number 930, the UE 905 may transmit an SL A-CSI report to the relay UE 910 based at least in part on measuring the first set of CSI-RSs. The relay UE 910 may receive the SL A-CSI report based at least in part on transmitting the first set of CSI-RSs. The SL A-CSI report may include the CSI calculated by the UE 905 for a sidelink channel, as described above. In some aspects, the UE 905 may transmit the SL A-CSI report to the relay UE 910 based at least in part on an indication (e.g., from the base station 110 and/or the relay UE 910) that the SL A-CSI report is to be transmitted to the relay UE 910. For example, the indication may be included in the SL A-CSI triggering message from the base station 110 (e.g., an RRC message), a configuration message from the relay UE 910, and/or the like.

In some aspects, the UE 905 may transmit the SL A-CSI report to the relay UE 910 in accordance with a wireless communication standard. The UE 905 may transmit the SL A-CSI report to the relay UE 910 in a MAC-CE, in a MAC payload, in SCI, and/or the like. In some aspects, the UE 905 may transmit the SL A-CSI report according to a sidelink grant included in the SL A-CSI triggering message or in a separate message from the base station 110. In some aspects, the UE 905 may transmit the SL A-CSI report to the base station 110 in addition to the relay UE 910, as described above in connection with FIG. 8.

As shown by reference number 935, the UE 905 may transmit a second set of CSI-RSs to the relay UE 910 in the second set of CSI-RS resources, and the relay UE 910 may measure the second set of CSI-RSs transmitted by the UE 905 in the second set of CSI-RS resources (e.g., on a sidelink channel), as described above in connection with FIG. 8. The relay UE 910 may calculate CSI for the sidelink channel based at least in part on measuring the second set CSI-RSs, as described above in connection with FIG. 8. The calculated CSI may include, for example, a CQI value, a PMI value, an RI value, a SINR value, an RSRP value, and/or the like. The UE 905 may not transmit the second set of CSI-RSs, and the relay UE 910 may not measure the second set of CSI-RSs, when the SL A-CSI triggering message indicates the first set of CSI-RS resources but does not indicate the second set of CSI-RS resources.

As shown by reference number 940, the relay UE 910 may transmit an SL A-CSI report to the UE 905 based at least in part on measuring the second set of CSI-RSs. The UE 905 may receive the SL A-CSI report based at least in part on transmitting the second set of CSI-RSs. The SL A-CSI report may include the CSI calculated by the relay UE 910 for a sidelink channel, as described above. In some aspects, the relay UE 910 may transmit the SL A-CSI report to the UE 905 based at least in part on an indication (e.g., from the base station 110 and/or the UE 905) that the SL A-CSI report is to be transmitted to the UE 905. For example, the indication may be included in the SL A-CSI triggering message from the base station 110 (e.g., an RRC message), a configuration message from the UE 905, and/or the like.

In some aspects, the relay UE 910 may transmit the SL A-CSI report to the UE 905 in accordance with a wireless communication standard. The relay UE 910 may transmit the SL A-CSI report to the UE 905 in a MAC-CE, in a MAC payload, in SCI, and/or the like. In some aspects, the relay UE 910 may transmit the SL A-CSI report according to a sidelink grant included in the SL A-CSI triggering message or in a separate message from the base station 110. In some aspects, the relay UE 910 may transmit the SL A-CSI report to the base station 110 in addition to the relay UE 910, as described above in connection with FIG. 8.

In some aspects, the SL A-CSI triggering messages may include only the first set of CSI-RS resources or only the second set of CSI-RS resources. Accordingly, in some aspects, only one of the relay UE 910 or the UE 905 may transmit the first set of CSI-RSs or the second set of CSI-RSs, respectively, and only the other of the UE 905 or the relay UE 910 may measure the first set of CSI-RSs or the second set of CSI-RSs, respectively, and generate and transmit an SL A-CSI report.

As shown by reference number 945, the relay UE 910 may transmit an SL A-CSI report to the base station 110 based at least in part on measuring the second set of CSI-RSs, as described above in connection with FIG. 8. The SL A-CSI report may include the CSI calculated by the relay UE 910 for a sidelink channel (e.g., with the UE 905), as described above. Additionally, or alternatively, the relay UE 910 may transmit (e.g., relay, forward, and/or the like) an SL A-CSI report, received from the UE 905, to the base station 110. The SL A-CSI report may include the CSI calculated by the UE 905 for a sidelink channel (e.g., with the relay UE 910), as described above.

The relay UE 910 may transmit the SL A-CSI report to the base station 110 in a MAC-CE, in a MAC payload, in UCI, in a physical uplink shared channel (PUSCH) communication, and/or the like. In some aspects, the relay UE 910 may also indicate, to the base station 110, the UE 905 associated with the SL A-CSI report (e.g., using a sidelink identifier that identifies a sidelink channel between the UE 905 and the relay UE 910, a UE identifier that identifies the UE 905, and/or the like).

As shown by reference number 950, the UE 905 may transmit an SL A-CSI report to the base station 110 based at least in part on measuring the first set of CSI-RSs, as described above in connection with FIG. 8. The SL A-CSI report may include the CSI calculated by the UE 905 for a sidelink channel (e.g., with the relay UE 910), as described above. Additionally, or alternatively, the UE 905 may transmit (e.g., relay, forward, and/or the like) an SL A-CSI report, received from the relay UE 910, to the base station 110. The SL A-CSI report may include the CSI calculated by the relay UE 910 for a sidelink channel (e.g., with the UE 905), as described above.

The UE 905 may transmit the SL A-CSI report to the base station 110 in a MAC-CE, in a MAC payload, in UCI, in a PUSCH communication, and/or the like. In some aspects, the UE 905 may also indicate, to the base station 110, the relay UE 910 associated with the SL A-CSI report (e.g., using a sidelink identifier that identifies a sidelink between the UE 905 and the relay UE 910, a UE identifier that identifies the relay UE 910, and/or the like).

In some aspects, only one of the relay UE 910 or the UE 905 may transmit SL A-CSI reports. For example, the relay UE 910 may transmit, to the base station 110, the SL A-CSI report calculated for the sidelink channel with the UE 905 as well as the SL A-CSI report received from the UE 905 and calculated for the sidelink channel with the relay UE 910. Additionally, or alternatively, the UE 905 may transmit, to the base station 110, the SL A-CSI report calculated for the sidelink channel with the relay UE 910 as well as the SL A-CSI report received from the relay UE 910 and calculated for the sidelink channel with the UE 905.

In some aspects, only one of the relay UE 910 or the UE 905 may generate a SL A-CSI report, as described above. Accordingly, only one of the relay UE 910 or the UE 905 may transmit the SL A-CSI report to the base station 110 either directly or after receiving the SL A-CSI report from the other of the relay UE 910 or the UE 905.

As shown by reference number 955, the base station 110 may transmit an indication of one or more MCSs, for sidelink communications between the relay UE 910 and the UE 905, to the relay UE 910, as described above in connection with FIG. 8. The base station 110 may determine (e.g., identify, select, and/or the like) the one or more MCSs based at least in part on receiving the SL A-CSI report from the relay UE 910, the SL A-CSI report from the UE 905, or a combination thereof.

As shown by reference number 960, the base station 110 may transmit an indication of one or more MCSs, for sidelink communications between the relay UE 910 and the UE 905, to the UE 905, as described above in connection with FIG. 8. The base station 110 may determine (e.g., identify, select, and/or the like) the one or more MCSs based at least in part on receiving the SL A-CSI report from the relay UE 910, the SL A-CSI report from the UE 905, or a combination thereof.

In some aspects, the base station 110 may send the one or more MCSs only to the relay UE 910, only to the UE 905, or to both the relay UE 910 and the UE 905, as described above in connection with FIG. 8.

In some aspects, based at least in part on receiving the indication of one or more MCSs from the base station 110, the relay UE 910 may transmit sidelink control information (SCI) to the UE 905 to schedule the sidelink communication. In some aspects, the relay UE 910 may not transmit the SCI, in which case the UE 905 may use blind demodulation and/or blind decoding for the sidelink communication (e.g., by testing multiple MCS hypotheses).

As shown by reference number 965, the base station 110 may transmit a communication (e.g., data, control information, and/or the like), intended for the UE 905, to the relay UE 910, as described above in connection with FIG. 8. As further shown by reference number 965, in some aspects, the base station 110 may also transmit the communication (e.g., the same data, the same control information, and/or the like) directly to the UE 905 (e.g., via a direct link and/or an access link, as described elsewhere herein), as described above in connection with FIG. 8.

As shown by reference number 970, based at least in part on receiving the communication intended for the UE 905 from the base station 110, the relay UE 910 may relay the communication (e.g., the data, the control information, and/or the like) to the UE 905 via a sidelink channel, as described above in connection with FIG. 8. Additionally, or alternatively, in some aspects, the relay UE 910 may function as an Rx UE. For example, the UE 905 may transmit a communication (e.g., data, control information, and/or the like), intended for the base station 110, to the relay UE 910 via a sidelink channel, as described above in connection with FIG. 8. Based at least in part on receiving the communication from the UE 905, the relay UE 910 may relay the communication (e.g., the data, the control information, and/or the like) to the base station 110, as described above in connection with FIG. 8.

Although techniques and apparatuses are described herein in connection with using an SL A-CSI report to assist a base station 110 with determining an MCS to be used for a sidelink channel that is to include a communication to be relayed from the base station 110 to the UE 905 via the relay UE 910, these techniques and apparatuses may be applied to determine one or more other transmission parameters (e.g., in addition to MCS or as an alternative to MCS). For example, the techniques and apparatuses described herein may be used to assist a base station 110 with determining a TB size, a resource allocation, a transmit power, a retransmission configuration (e.g., whether to enable or disable retransmissions or a maximum number of retransmissions, among other examples), and/or the like, to be used for a sidelink channel that is to include a communication to be relayed from the base station 110 to the UE 905 via the relay UE 910 and/or a communication to be relayed from the UE 805 to the base station 110 via the relay UE 810.

Using the aperiodic CSI reporting procedure described in connection with FIG. 9 enables the base station 110 to trigger sidelink communications as well as assist with scheduling and/or controlling of the sidelink communications by selecting and/or controlling one or more transmission parameters, such as MCS. As a result, the base station 110 may be enabled to satisfy one or more base station objectives, such as a target PER associated with communications between the base station 110 and the UE 905, a target BLER associated with communications between the base station 110 and the UE 905, and/or the like.

As indicated above, FIG. 9 is provided as an example. Other examples may differ from what is described with respect to FIG. 9.

Figure 10:
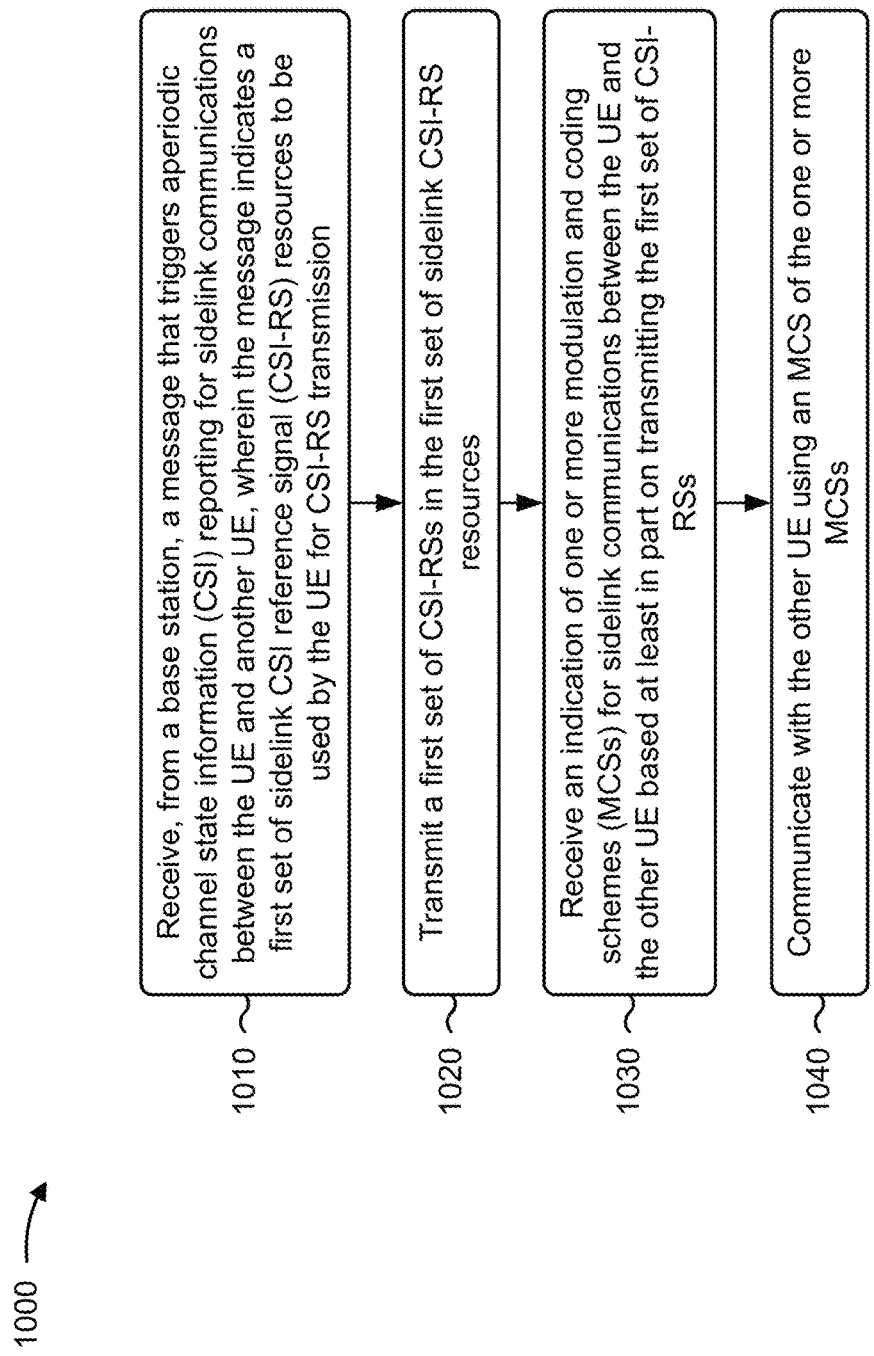
FIG. 10 is a diagram illustrating an example process performed, for example, by a UE, in accordance with the present disclosure.

FIG. 10 is a diagram illustrating an example process 1000 performed, for example, by a user equipment, in accordance with the present disclosure. Example process 1000 is an example where the UE (e.g., UE 120, relay UE 810, UE 905, relay UE 910, and/or the like) performs operations associated with sidelink aperiodic channel state information reporting triggered by a base station.

As shown in FIG. 10, in some aspects, process 1000 may include receiving, from a base station, a message that triggers aperiodic CSI reporting for sidelink communications between the UE and another UE, wherein the message indicates a first set of sidelink CSI-RS resources to be used by the UE for CSI-RS transmission (block 1010). For example, the UE (e.g., using receive processor 258, transmit processor 264, controller/processor 280, memory 282, and/or the like) may receive, from a base station, the message that triggers aperiodic CSI reporting for sidelink communications, as described above, for example, with reference to FIGS. 8 and/or 9. In some aspects, the message indicates a first set of sidelink CSI-RS resources to be used by the UE for CSI-RS transmission.

As further shown in FIG. 10, in some aspects, process 1000 may include transmitting a first set of CSI-RSs in the first set of sidelink CSI-RS resources (block 1020). For example, the UE (e.g., using receive processor 258, transmit processor 264, controller/processor 280, memory 282, and/or the like) may transmit the first set of CSI-RSs in the first set of sidelink CSI-RS resources, as described above, for example, with reference to FIGS. 8 and/or 9.

As further shown in FIG. 10, in some aspects, process 1000 may include receiving an indication of one or more MCSs for sidelink communications between the UE and the other UE (block 1030). For example, the UE (e.g., using receive processor 258, transmit processor 264, controller/processor 280, memory 282, and/or the like) may receive the indication of one or more MCSs for sidelink communications between the UE and the other UE based at least in part on transmitting the first set of CSI-RSs, as described above, for example, with reference to FIGS. 8 and/or 9.

As further shown in FIG. 10, in some aspects, process 1000 may include communicating with the other UE (block 1040). For example, the UE (e.g., using receive processor 258, transmit processor 264, controller/processor 280, memory 282, and/or the like) may communicate with the other UE using an MCS of the one or more MCSs, as described above, for example, with reference to FIGS. 8 and/or 9.

Process 1000 may include additional aspects, such as any single aspect or any combination of aspects described below and/or in connection with one or more other processes described elsewhere herein.

In a first aspect, the UE is a relay UE that relays communications between the base station and the other UE.

In a second aspect, alone or in combination with the first aspect, process 1000 includes receiving, from the base station, a communication to be relayed to the other UE; and communicating with the other UE comprises relaying the communication to the other UE via a sidelink communication that is modulated using the MCS.

In a third aspect, alone or in combination with one or more of the first and second aspects, communicating with the other UE comprises receiving, from the other UE, a communication to be relayed to the base station, the communication is included in a sidelink communication that is modulated using the MCS, and process 1000 further comprises relaying the communication to the base station.

In a fourth aspect, alone or in combination with one or more of the first through third aspects, the other UE is a relay UE that relays communications between the base station and the UE.

In a fifth aspect, alone or in combination with one or more of the first through fourth aspects, communicating with the other UE comprises receiving, from the other UE, a sidelink communication that includes a communication transmitted from the base station to the other UE, the sidelink communication is modulated using the MCS.

In a sixth aspect, alone or in combination with one or more of the first through fifth aspects, communicating with the other UE comprises transmitting, to the other UE, a sidelink communication that includes a communication to be relayed to the base station by the other UE, the sidelink communication is modulated using the MCS.

In a seventh aspect, alone or in combination with one or more of the first through sixth aspects, the indication of the one or more MCSs is received from the base station.

In an eighth aspect, alone or in combination with one or more of the first through seventh aspects, the indication of the one or more MCSs is received from the other UE.

In a ninth aspect, alone or in combination with one or more of the first through eighth aspects, process 1000 includes receiving a sidelink aperiodic CSI report from the other UE based at least in part on transmitting the first set of CSI-RSs.

In a tenth aspect, alone or in combination with one or more of the first through ninth aspects, process 1000 includes transmitting the sidelink aperiodic CSI report to the base station.

In an eleventh aspect, alone or in combination with one or more of the first through tenth aspects, the sidelink aperiodic CSI report is transmitted using at least one of a medium access control (MAC) control element, a MAC payload, uplink control information, a physical uplink shared channel (PUSCH) communication, or a combination thereof.

In a twelfth aspect, alone or in combination with one or more of the first through eleventh aspects, process 1000 includes receiving, from the base station, an indication of a second set of sidelink CSI-RS resources to be used by the UE for CSI-RS measurement; measuring the second set of CSI-RSs in the second set of sidelink CSI-RS resources; and transmitting a sidelink aperiodic CSI report based at least in part on measuring the second set of CSI-RSs.

In a thirteenth aspect, alone or in combination with one or more of the first through twelfth aspects, the indication of the second set of sidelink CSI-RS resources is included in the message.

In a fourteenth aspect, alone or in combination with one or more of the first through thirteenth aspects, the sidelink aperiodic CSI report is transmitted to the base station.

In a fifteenth aspect, alone or in combination with one or more of the first through fourteenth aspects, the sidelink aperiodic CSI report is transmitted using at least one of a MAC control element, a MAC payload, uplink control information, a PUSCH communication, or a combination thereof.

In a sixteenth aspect, alone or in combination with one or more of the first through fifteenth aspects, process 1000 includes receiving an indication of an uplink resource in which the sidelink aperiodic CSI report is to be transmitted to the base station; and the sidelink aperiodic CSI report is transmitted to the base station using the uplink resource.

In a seventeenth aspect, alone or in combination with one or more of the first through sixteenth aspects, the indication of the uplink resource is included in the message.

In an eighteenth aspect, alone or in combination with one or more of the first through seventeenth aspects, the sidelink aperiodic CSI report is transmitted to the other UE.

In a nineteenth aspect, alone or in combination with one or more of the first through eighteenth aspects, process 1000 includes receiving an indication of a sidelink resource in which the sidelink aperiodic CSI report is to be transmitted to the other UE; and the sidelink aperiodic CSI report is transmitted to the other UE using the sidelink resource.

In a twentieth aspect, alone or in combination with one or more of the first through nineteenth aspects, the indication of the sidelink resource is included in the message.

In a twenty-first aspect, alone or in combination with one or more of the first through twentieth aspects, the sidelink aperiodic CSI report is transmitted to both the other UE and to the base station.

In a twenty-second aspect, alone or in combination with one or more of the first through twenty first aspects, the sidelink aperiodic CSI report and another sidelink aperiodic CSI report, received from the other UE, are both transmitted to the base station.

In a twenty-third aspect, alone or in combination with one or more of the first through twenty second aspects, the message is a downlink control information message.

In a twenty-fourth aspect, alone or in combination with one or more of the first through twenty third aspects, the message includes at least one of a sidelink identifier that identifies a sidelink between the UE and the other UE, a UE identifier that identifies the other UE, or a combination thereof.

In a twenty-fifth aspect, alone or in combination with one or more of the first through twenty fourth aspects, the one or more MCSs include multiple MCSs or a range of MCSs, and the UE selects the MCS, from the multiple MCSs or the range of MCSs, to communicate with the other UE.

In a twenty-sixth aspect, alone or in combination with one or more of the first through twenty fifth aspects, the one or more MCSs consist of a single MCS, and the single MCS is used to communicate with the other UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
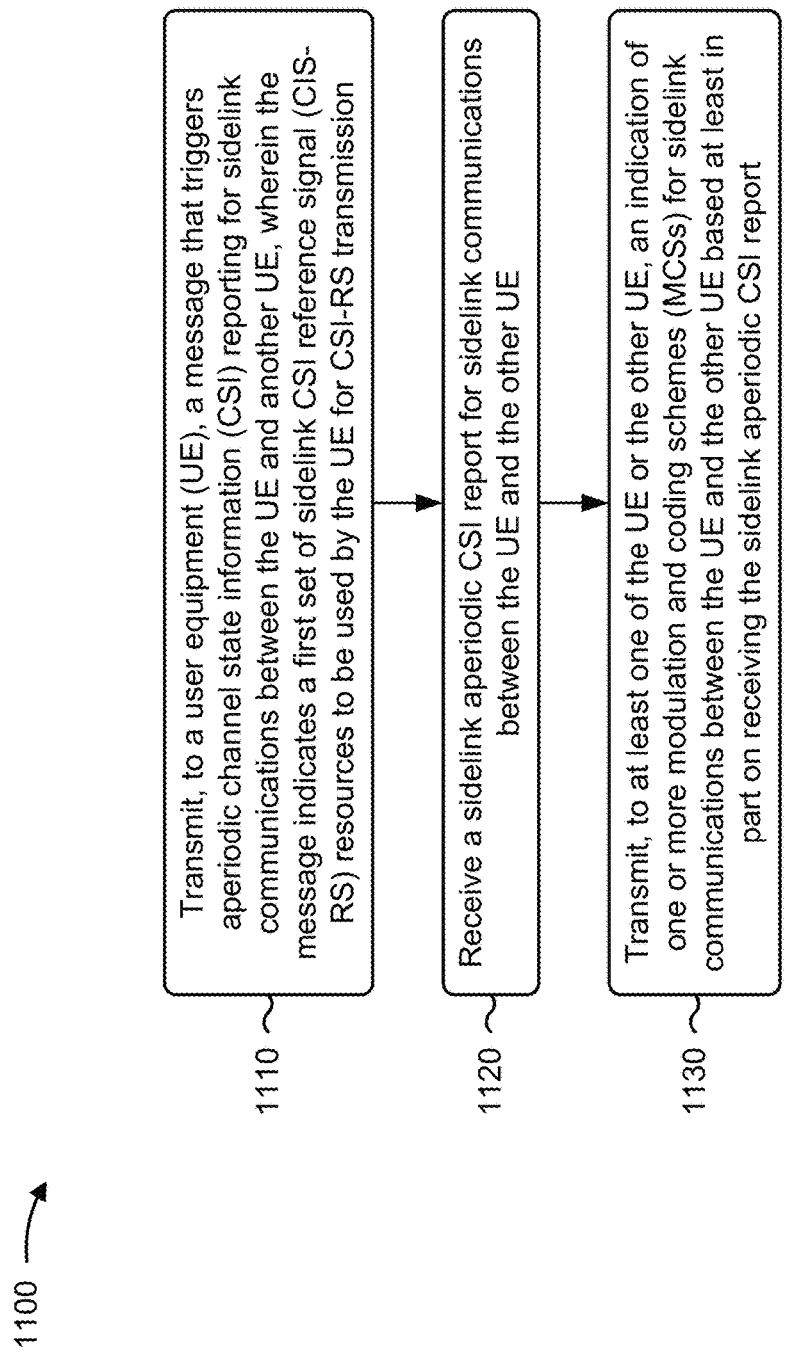
FIG. 11 is a diagram illustrating an example process performed, for example, by a base station, in accordance with the present disclosure.

FIG. 11 is a diagram illustrating an example process 1100 performed, for example, by a base station, in accordance with the present disclosure. Example process 1100 is an example where the base station (e.g., base station 110 and/or the like) performs operations associated with sidelink aperiodic channel state information reporting triggered by a base station.

As shown in FIG. 11, in some aspects, process 1100 may include transmitting, to a UE, a message that triggers aperiodic CSI reporting for sidelink communications between the UE and another UE (block 1110). For example, the base station (e.g., using receive processor 238, controller/processor 240, memory 242, and/or the like) may transmit, to the UE, a message that triggers aperiodic CSI reporting for sidelink communications between the UE and another UE, as described above, for example, with reference to FIGS. 8 and/or 9. In some aspects, the message indicates a first set of sidelink CSI-RS resources to be used by the UE for CSI-RS transmission.

As further shown in FIG. 11, in some aspects, process 1100 may include receiving a sidelink aperiodic CSI report for sidelink communications between the UE and the other UE (block 1120). For example, the base station (e.g., using receive processor 238, controller/processor 240, memory 242, and/or the like) may receive a sidelink aperiodic CSI report for sidelink communications between the UE and the other UE, as described above, for example, with reference to FIGS. 8 and/or 9.

As further shown in FIG. 11, in some aspects, process 1100 may include transmitting, to at least one of the UE or the other UE, an indication of one or more MCSs for sidelink communications between the UE and the other UE (block 1130). For example, the base station (e.g., using receive processor 238, controller/processor 240, memory 242, and/or the like) may transmit, to at least one of the UE or the other UE, an indication of one or more MCSs for sidelink communications between the UE and the other UE based at least in part on receiving the sidelink aperiodic CSI report, as described above, for example, with reference to FIGS. 8 and/or 9.

Process 1100 may include additional aspects, such as any single aspect or any combination of aspects described below and/or in connection with one or more other processes described elsewhere herein.

In a first aspect, the UE is a relay UE that relays communications between the base station and the other UE.

In a second aspect, alone or in combination with the first aspect, process 1100 includes transmitting, to the UE, a communication to be relayed by the UE to the other UE using a sidelink communication modulated using an MCS of the one or more MCSs.

In a third aspect, alone or in combination with one or more of the first and second aspects, process 1100 includes receiving, from the UE, a communication relayed by the UE from the other UE; and the communication is transmitted from the other UE to the UE via a sidelink communication that is modulated using an MCS of the one or more MCSs.

In a fourth aspect, alone or in combination with one or more of the first through third aspects, the other UE is a relay UE that relays communications between the base station and the UE.

In a fifth aspect, alone or in combination with one or more of the first through fourth aspects, process 1100 includes transmitting, to the other UE, a communication to be relayed by the other UE to the UE using a sidelink communication modulated using an MCS of the one or more MCSs.

In a sixth aspect, alone or in combination with one or more of the first through fifth aspects, process 1100 includes receiving, from the other UE, a communication relayed by the other UE from the UE; and the communication is transmitted from the UE to the other UE via a sidelink communication that is modulated using an MCS of the one or more MCSs.

In a seventh aspect, alone or in combination with one or more of the first through sixth aspects, receiving the sidelink aperiodic CSI report comprises at least one of receiving a first sidelink aperiodic CSI report from the UE, receiving a second sidelink aperiodic CSI report from the other UE, or a combination thereof.

In an eighth aspect, alone or in combination with one or more of the first through seventh aspects, the sidelink aperiodic CSI report is received in at least one of a MAC control element, a MAC payload, uplink control information, a PUSCH communication, or a combination thereof.

In a ninth aspect, alone or in combination with one or more of the first through eighth aspects, process 1100 includes transmitting, to the UE, an indication of a second set of sidelink CSI-RS resources to be used by the UE for CSI-RS measurement; and receiving the sidelink aperiodic CSI report based at least in part on transmitting the indication of the second set of CSI-RSs.

In a tenth aspect, alone or in combination with one or more of the first through ninth aspects, the indication of the second set of sidelink CSI-RS resources is included in the message.

In an eleventh aspect, alone or in combination with one or more of the first through tenth aspects, process 1100 includes transmitting, to at least one of the UE or the other UE, an indication of an uplink resource in which the sidelink aperiodic CSI report is to be transmitted to the base station; and the sidelink aperiodic CSI report is received using the uplink resource.

In a twelfth aspect, alone or in combination with one or more of the first through eleventh aspects, the indication of the uplink resource is included in the message.

In a thirteenth aspect, alone or in combination with one or more of the first through twelfth aspects, process 1100 includes transmitting, to at least one of the UE or the other UE, an indication of a sidelink resource in which the sidelink aperiodic CSI report is to be transmitted.

In a fourteenth aspect, alone or in combination with one or more of the first through thirteenth aspects, the indication of the sidelink resource is included in the message.

In a fifteenth aspect, alone or in combination with one or more of the first through fourteenth aspects, the message is a downlink control information message.

In a sixteenth aspect, alone or in combination with one or more of the first through fifteenth aspects, the message includes at least one of a sidelink identifier that identifies a sidelink between the UE and the other UE, a first UE identifier that identifies the UE, a second UE identifier that identifies the other UE, or a combination thereof.

In a seventeenth aspect, alone or in combination with one or more of the first through sixteenth aspects, the one or more MCSs include multiple MCSs or a range of MCSs.

In an eighteenth aspect, alone or in combination with one or more of the first through seventeenth aspects, the one or more MCSs consist of a single MCS.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: receiving, from a base station, a message that triggers aperiodic channel state information (CSI) reporting for sidelink communications between the UE and another UE, wherein the message indicates a first set of sidelink CSI reference signal (CSI-RS) resources to be used by the UE for CSI-RS transmission; transmitting a first set of CSI-RSs in the first set of sidelink CSI-RS resources; receiving an indication of one or more modulation and coding schemes (MCSs) for sidelink communications between the UE and the other UE based at least in part on transmitting the first set of CSI-RSs; and communicating with the other UE using an MCS of the one or more MCSs.

Aspect 2: The method of Aspect 1, wherein the UE is a relay UE that relays communications between the base station and the other UE.

Aspect 3: The method of Aspect 2, further comprising receiving, from the base station, a communication to be relayed to the other UE; and wherein communicating with the other UE comprises relaying the communication to the other UE via a sidelink communication that is modulated using the MCS.

Aspect 4: The method of any of Aspects 2-3, wherein communicating with the other UE comprises receiving, from the other UE, a communication to be relayed to the base station, wherein the communication is included in a sidelink communication that is modulated using the MCS; and wherein the method further comprises relaying the communication to the base station.

Aspect 5: The method of Aspect 1, wherein the other UE is a relay UE that relays communications between the base station and the UE.

Aspect 6: The method of Aspect 5, wherein communicating with the other UE comprises receiving, from the other UE, a sidelink communication that includes a communication transmitted from the base station to the other UE, wherein the sidelink communication is modulated using the MCS.

Aspect 7: The method of any of Aspects 5-6, wherein communicating with the other UE comprises transmitting, to the other UE, a sidelink communication that includes a communication to be relayed to the base station by the other UE, wherein the sidelink communication is modulated using the MCS.

Aspect 8: The method of any of Aspects 1-7, wherein the indication of the one or more MCSs is received from the base station.

Aspect 9: The method of any of Aspects 1-7, wherein the indication of the one or more MCSs is received from the other UE.

Aspect 10: The method of any of Aspects 1-9, further comprising receiving a sidelink aperiodic CSI report from the other UE based at least in part on transmitting the first set of CSI-RSs.

Aspect 11: The method of Aspect 10, further comprising transmitting the sidelink aperiodic CSI report to the base station.

Aspect 12: The method of Aspect 11, wherein the sidelink aperiodic CSI report is transmitted using at least one of a medium access control (MAC) control element, a MAC payload, uplink control information, a physical uplink shared channel (PUSCH) communication, or a combination thereof.

Aspect 13: The method of any of Aspects 1-12, further comprising: receiving, from the base station, an indication of a second set of sidelink CSI-RS resources to be used by the UE for CSI-RS measurement; measuring the second set of CSI-RSs in the second set of sidelink CSI-RS resources; and transmitting a sidelink aperiodic CSI report based at least in part on measuring the second set of CSI-RSs.

Aspect 14: The method of Aspect 13, wherein the indication of the second set of sidelink CSI-RS resources is included in the message.

Aspect 15: The method of any of Aspects 13-14, wherein the sidelink aperiodic CSI report is transmitted to the base station.

Aspect 16: The method of Aspect 15, wherein the sidelink aperiodic CSI report is transmitted using at least one of a medium access control (MAC) control element, a MAC payload, uplink control information, a physical uplink shared channel (PUSCH) communication, or a combination thereof.

Aspect 17: The method of any of Aspects 15-16, further comprising: receiving an indication of an uplink resource in which the sidelink aperiodic CSI report is to be transmitted to the base station; and wherein the sidelink aperiodic CSI report is transmitted to the base station using the uplink resource. wherein the sidelink aperiodic CSI report is transmitted to the base station using the uplink resource.

Aspect 18: The method of Aspect 17, wherein the indication of the uplink resource is included in the message.

Aspect 19: The method of Aspect 13, wherein the sidelink aperiodic CSI report is transmitted to the other UE.

Aspect 20: The method of Aspect 19, further comprising: receiving an indication of a sidelink resource in which the sidelink aperiodic CSI report is to be transmitted to the other UE; and wherein the sidelink aperiodic CSI report is transmitted to the other UE using the sidelink resource. wherein the sidelink aperiodic CSI report is transmitted to the other UE using the sidelink resource.

Aspect 21: The method of Aspect 20, wherein the indication of the sidelink resource is included in the message.

Aspect 22: The method of Aspect 13, wherein the sidelink aperiodic CSI report is transmitted to both the other UE and to the base station.

Aspect 23: The method of Aspect 13, wherein the sidelink aperiodic CSI report and another sidelink aperiodic CSI report, received from the other UE, are both transmitted to the base station.

Aspect 24: The method of any of Aspects 1-23, wherein the message is a downlink control information message.

Aspect 25: The method of any of Aspects 1-24, wherein the message includes at least one of a sidelink identifier that identifies a sidelink between the UE and the other UE, a UE identifier that identifies the other UE, or a combination thereof.

Aspect 26: The method of any of Aspects 1-25, wherein the one or more MCSs include multiple MCSs or a range of MCSs, and wherein the UE selects the MCS, from the multiple MCSs or the range of MCSs, to communicate with the other UE.

Aspect 27: The method of any of Aspects 1-26, wherein the one or more MCSs consist of a single MCS, and wherein the single MCS is used to communicate with the other UE.

Aspect 28: A method of wireless communication performed by a base station, comprising: transmitting, to a user equipment (UE), a message that triggers aperiodic channel state information (CSI) reporting for sidelink communications between the UE and another UE, wherein the message indicates a first set of sidelink CSI reference signal (CSI-RS) resources to be used by the UE for CSI-RS transmission; receiving a sidelink aperiodic CSI report for sidelink communications between the UE and the other UE; and transmitting, to at least one of the UE or the other UE, an indication of one or more modulation and coding schemes (MCSs) for sidelink communications between the UE and the other UE based at least in part on receiving the sidelink aperiodic CSI report.

Aspect 29: The method of Aspect 28, wherein the UE is a relay UE that relays communications between the base station and the other UE.

Aspect 30: The method of Aspect 29, further comprising transmitting, to the UE, a communication to be relayed by the UE to the other UE using a sidelink communication modulated using an MCS of the one or more MCSs.

Aspect 31: The method of any of Aspects 29-30, further comprising receiving, from the UE, a communication relayed by the UE from the other UE, wherein the communication is transmitted from the other UE to the UE via a sidelink communication that is modulated using an MCS of the one or more MCSs.

Aspect 32: The method of Aspect 28, wherein the other UE is a relay UE that relays communications between the base station and the UE.

Aspect 33: The method of Aspect 32, further comprising transmitting, to the other UE, a communication to be relayed by the other UE to the UE using a sidelink communication modulated using an MCS of the one or more MCSs.

Aspect 34: The method of any of Aspects 32-33, further comprising receiving, from the other UE, a communication relayed by the other UE from the UE, wherein the communication is transmitted from the UE to the other UE via a sidelink communication that is modulated using an MCS of the one or more MCSs.

Aspect 35: The method of any of Aspects 28-34, wherein receiving the sidelink aperiodic CSI report comprises at least one of receiving a first sidelink aperiodic CSI report from the UE, receiving a second sidelink aperiodic CSI report from the other UE, or a combination thereof.

Aspect 36: The method of any of Aspects 28-35, wherein the sidelink aperiodic CSI report is received in at least one of a medium access control (MAC) control element, a MAC payload, uplink control information, a physical uplink shared channel (PUSCH) communication, or a combination thereof.

Aspect 37: The method of any of Aspects 28-36, further comprising: transmitting, to the UE, an indication of a second set of sidelink CSI-RS resources to be used by the UE for CSI-RS measurement; and receiving the sidelink aperiodic CSI report based at least in part on transmitting the indication of the second set of CSI-RSs.

Aspect 38: The method of Aspect 37, wherein the indication of the second set of sidelink CSI-RS resources is included in the message.

Aspect 39: The method of any of Aspects 28-38, further comprising: transmitting, to at least one of the UE or the other UE, an indication of an uplink resource in which the sidelink aperiodic CSI report is to be transmitted to the base station; and wherein the sidelink aperiodic CSI report is received using the uplink resource. wherein the sidelink aperiodic CSI report is received using the uplink resource.

Aspect 40: The method of Aspect 39, wherein the indication of the uplink resource is included in the message.

Aspect 41: The method of any of Aspects 28-40, further comprising transmitting, to at least one of the UE or the other UE, an indication of a sidelink resource in which the sidelink aperiodic CSI report is to be transmitted.

Aspect 42: The method of Aspect 41, wherein the indication of the sidelink resource is included in the message.

Aspect 43: The method of any of Aspects 28-42, wherein the message is a downlink control information message.

Aspect 44: The method of any of Aspects 28-43, wherein the message includes at least one of a sidelink identifier that identifies a sidelink between the UE and the other UE, a first UE identifier that identifies the UE, a second UE identifier that identifies the other UE, or a combination thereof.

Aspect 45: The method of any of Aspects 28-44, wherein the one or more MCSs include multiple MCSs or a range of MCSs.

Aspect 46: The method of any of Aspects 28-45, wherein the one or more MCSs consist of a single MCS.

Aspect 47: An apparatus for wireless communication at a device, comprising a processor; memory coupled with the processor; and instructions stored in the memory and executable by the processor to cause the apparatus to perform the method of one or more Aspects of Aspects 1-27.

Aspect 48: A device for wireless communication, comprising a memory and one or more processors coupled to the memory, the memory and the one or more processors configured to perform the method of one or more Aspects of Aspects 1-27.

Aspect 49: An apparatus for wireless communication, comprising at least one means for performing the method of one or more Aspects of Aspects 1-27.

Aspect 50: A non-transitory computer-readable medium storing code for wireless communication, the code comprising instructions executable by a processor to perform the method of one or more Aspects of Aspects 1-27.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 1-27.

Aspect 52: An apparatus for wireless communication at a device, comprising a processor; memory coupled with the processor; and instructions stored in the memory and executable by the processor to cause the apparatus to perform the method of one or more Aspects of Aspects 28-46.

Aspect 53: A device for wireless communication, comprising a memory and one or more processors coupled to the memory, the memory and the one or more processors configured to perform the method of one or more Aspects of Aspects 28-46.

Aspect 54: An apparatus for wireless communication, comprising at least one means for performing the method of one or more Aspects of Aspects 28-46.

Aspect 55: A non-transitory computer-readable medium storing code for wireless communication, the code comprising instructions executable by a processor to perform the method of one or more Aspects of Aspects 28-46.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 28-46.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a base station, a message that triggers aperiodic channel state information (CSI) reporting for sidelink communications between the UE and another UE, wherein the message indicates a first set of sidelink CSI reference signal (CSI-RS) resources to be used by the UE for CSI-RS transmission;
transmitting a first set of CSI-RSs in the first set of sidelink CSI-RS resources;
receiving an indication of one or more modulation and coding schemes (MCSs) for sidelink communications between the UE and the other UE based at least in part on transmitting the first set of CSI-RSs; and
communicating with the other UE using an MCS of the one or more MCSs.

2. The method of claim 1, wherein the UE is a relay UE that relays communications between the base station and the other UE.

3. The method of claim 2, further comprising receiving, from the base station, a communication to be relayed to the other UE; and
wherein communicating with the other UE comprises relaying the communication to the other UE via a sidelink communication that is modulated using the MCS.

4. The method of claim 2, wherein communicating with the other UE comprises receiving, from the other UE, a communication to be relayed to the base station, wherein the communication is included in a sidelink communication that is modulated using the MCS; and
wherein the method further comprises relaying the communication to the base station.

5. The method of claim 1, wherein the other UE is a relay UE that relays communications between the base station and the UE.

6. The method of claim 5, wherein communicating with the other UE comprises receiving, from the other UE, a sidelink communication that includes a communication transmitted from the base station to the other UE, wherein the sidelink communication is modulated using the MCS.

7. The method of claim 5, wherein communicating with the other UE comprises transmitting, to the other UE, a sidelink communication that includes a communication to be relayed to the base station by the other UE, wherein the sidelink communication is modulated using the MCS.

8. The method of claim 1, wherein the indication of the one or more MCSs is received from the base station or is received from the other UE.

9. The method of claim 1, further comprising receiving a sidelink aperiodic CSI report from the other UE based at least in part on transmitting the first set of CSI-RSs.

10. The method of claim 9, further comprising transmitting the sidelink aperiodic CSI report to the base station.

11. The method of claim 1, further comprising:
receiving, from the base station, an indication of a second set of sidelink CSI-RS resources to be used by the UE for CSI-RS measurement;
measuring the second set of CSI-RSs in the second set of sidelink CSI-RS resources; and
transmitting a sidelink aperiodic CSI report based at least in part on measuring the second set of CSI-RSs.

12. The method of claim 11, wherein the sidelink aperiodic CSI report is transmitted to the base station.

13. The method of claim 12, further comprising:
receiving an indication of an uplink resource in which the sidelink aperiodic CSI report is to be transmitted to the base station; and
wherein the sidelink aperiodic CSI report is transmitted to the base station using the uplink resource.

14. The method of claim 11, wherein the sidelink aperiodic CSI report is transmitted to the other UE.

15. The method of claim 14, further comprising:
receiving an indication of a sidelink resource in which the sidelink aperiodic CSI report is to be transmitted to the other UE; and
wherein the sidelink aperiodic CSI report is transmitted to the other UE using the sidelink resource.

16. The method of claim 11, wherein the sidelink aperiodic CSI report and another sidelink aperiodic CSI report, received from the other UE, are both transmitted to the base station.

17. The method of claim 1, wherein the message includes at least one of a sidelink identifier that identifies a sidelink between the UE and the other UE, a UE identifier that identifies the other UE, or a combination thereof.

18. The method of claim 1, wherein the one or more MCSs include one of:
multiple MCSs or a range of MCSs, wherein the UE selects the MCS, from the multiple MCSs or the range of MCSs, to communicate with the other UE; or
a single MCS, wherein the single MCS is used to communicate with the other UE.

19. A user equipment (UE) for wireless communication, comprising:
a memory; and
one or more processors, coupled to the memory, configured to:
receive, from a base station, a message that triggers aperiodic channel state information (CSI) reporting for sidelink communications between the UE and another UE, wherein the message indicates a first set of sidelink CSI reference signal (CSI-RS) resources to be used by the UE for CSI-RS transmission;
transmit a first set of CSI-RSs in the first set of sidelink CSI-RS resources;
receive an indication of one or more modulation and coding schemes (MCSs) for sidelink communications between the UE and the other UE based at least in part on transmitting the first set of CSI-RSs; and
communicate with the other UE using an MCS of the one or more MCSs.

20. The UE of claim 19, wherein the UE is a relay UE that relays communications between the base station and the other UE.

21. The UE of claim 20, wherein the one or more processors are further configured to receive, from the base station, a communication to be relayed to the other UE; and
wherein the one or more processors, to communicate with the other UE, are configured to relay the communication to the other UE via a sidelink communication that is modulated using the MCS.

22. The UE of claim 20, wherein communicating with the other UE comprises the one or more processors, to communicate with the other UE, are configured to receive, from the other UE, a communication to be relayed to the base station, wherein the communication is included in a sidelink communication that is modulated using the MCS; and
wherein the one or more processors are further configured to relay the communication to the base station.

23. The UE of claim 19, wherein the other UE is a relay UE that relays communications between the base station and the UE.

24. The UE of claim 23, wherein the one or more processors, to communicate with the other UE, are configured to receive, from the other UE, a sidelink communication that includes a communication transmitted from the base station to the other UE, wherein the sidelink communication is modulated using the MCS.

25. The UE of claim 23, wherein the one or more processors, to communicate with the other UE, are configured to transmit, to the other UE, a sidelink communication that includes a communication to be relayed to the base station by the other UE, wherein the sidelink communication is modulated using the MCS.

26. A method of wireless communication performed by a base station, comprising:
- transmitting, to a user equipment (UE), a message that triggers aperiodic channel state information (CSI) reporting for sidelink communications between the UE and another UE, wherein the message indicates a first set of sidelink CSI reference signal (CSI-RS) resources to be used by the UE for CSI-RS transmission;
- receiving a sidelink aperiodic CSI report for sidelink communications between the UE and the other UE; and
- transmitting, to at least one of the UE or the other UE, an indication of one or more modulation and coding schemes (MCSs) for sidelink communications between the UE and the other UE based at least in part on receiving the sidelink aperiodic CSI report.

27. The method of claim 26, wherein the UE is a relay UE that relays communications between the base station and the other UE.

28. The method of claim 26, wherein the other UE is a relay UE that relays communications between the base station and the UE.

29. The method of claim 26, wherein receiving the sidelink aperiodic CSI report comprises at least one of receiving a first sidelink aperiodic CSI report from the UE, receiving a second sidelink aperiodic CSI report from the other UE, or a combination thereof.

30. A base station for wireless communication, comprising:
- a memory; and
- one or more processors, coupled to the memory, configured to:
  - transmit, to a user equipment (UE), a message that triggers aperiodic channel state information (CSI) reporting for sidelink communications between the UE and another UE, wherein the message indicates a first set of sidelink CSI reference signal (CSI-RS) resources to be used by the UE for CSI-RS transmission;
  - receive a sidelink aperiodic CSI report for sidelink communications between the UE and the other UE; and
  - transmit, to at least one of the UE or the other UE, an indication of one or more modulation and coding schemes (MCSs) for sidelink communications between the UE and the other UE based at least in part on receiving the sidelink aperiodic CSI report.

* * * * *